(12) United States Patent
Tyan et al.

(10) Patent No.: US 12,711,752 B2
(45) Date of Patent: Aug. 18, 2026

(54) POLARIZED IMAGE ENHANCEMENT USING DEEP NEURAL NETWORKS

(71) Applicant: SRI International, Menlo Park, CA (US)

(72) Inventors: Jenn-Kwei Tyan, Princeton, NJ (US); Michael Raymond Piacentino, Robbinsville, NJ (US)

(73) Assignee: SRI International, Menlo Park, CA (US)

( * ) Notice: Subject to any disclaimer, the term of this patent is extended or adjusted under 35 U.S.C. 154(b) by 279 days.

(21) Appl. No.: 18/282,156

(22) PCT Filed: Mar. 21, 2022

(86) PCT No.: PCT/US2022/071233
§ 371 (c)(1),
(2) Date: Sep. 14, 2023

(87) PCT Pub. No.: WO2022/204666
PCT Pub. Date: Sep. 29, 2022

(65) Prior Publication Data

US 2024/0161479 A1 May 16, 2024

Related U.S. Application Data

(60) Provisional application No. 63/166,203, filed on Mar. 25, 2021.

(51) Int. Cl.
*G06V 10/80* (2022.01)
*G02B 5/30* (2006.01)
(Continued)

(52) U.S. Cl.
CPC ......... *G06V 10/806* (2022.01); *G02B 5/3025* (2013.01); *G06V 10/42* (2022.01);
(Continued)

(58) Field of Classification Search
CPC ...... G06V 10/806; G06V 10/42; G06V 10/82; G06V 10/44; G06V 2201/07; G02B 5/3025
See application file for complete search history.

(56) References Cited

U.S. PATENT DOCUMENTS

2012/0307132 A1* 12/2012 Fan ..................... H04N 23/951 348/E5.045
2020/0005462 A1 1/2020 Spizhevoy et al.
2021/0264607 A1* 8/2021 Kalra ................ G06V 10/7715

FOREIGN PATENT DOCUMENTS

CA 3109406 3/2021
CN 109784245 5/2019

OTHER PUBLICATIONS

Zhang, J., Zhou, H., Wei, S., & Tan, W. (Dec. 2019). Infrared polarization image fusion via multi-scale sparse representation and pulse coupled neural network. In AOPC 2019: Optical Sensing and Imaging Technology (vol. 11338, pp. 567-577). SPIE. (Year: 2019).*

(Continued)

*Primary Examiner* — David Perlman
(74) *Attorney, Agent, or Firm* — McDonnell Boehnen Hulbert & Berghoff LLP

(57) ABSTRACT

Methods and systems directed to processing of a polarized image are disclosed. A method may involve determining a polarization characterization for a polarized image. The polarization characterization is indicative of polarization data associated with a plurality of polarization directions of incident light in the polarized image. The method may also involve extracting, from the polarized image, a first collection of global features and a second collection of local features. The method may further involve performing, based on the polarization characterization, a global feature fusion to fuse global features in the first collection, and a local feature fusion to fuse local features in the second collection.

(Continued)

The method may involve compositing the polarization characterization with the fused global features and the fused local features to generate a reconstructed image. The method may also involve providing the reconstructed image to an image processing resource to perform one or more image processing tasks.

19 Claims, 13 Drawing Sheets

(51) Int. Cl.
*G06V 10/42* (2022.01)
*G06V 10/44* (2022.01)
*G06V 10/82* (2022.01)

(52) U.S. Cl.
CPC .............. *G06V 10/44* (2022.01); *G06V 10/82* (2022.01); *G06V 2201/07* (2022.01)

(56) References Cited

OTHER PUBLICATIONS

Zhang, J., Zhang, Y., & Shi, Z. (2018). Long-wave infrared polarization feature extraction and image fusion based on the orthogonality difference method. Journal of Electronic Imaging, 27(2), 023021-023021. (Year: 2018).*
Xie, F., & Chen, J. (Dec. 2020). A new polarized image fusion algorithm based on two-scale guided filtering. In 2020 Asia-Pacific Signal and Information Processing Association Annual Summit and Conference (APSIPA ASC) (pp. 1150-1155). IEEE. (Year: 2020).*
International Searching Authority, International Search Report and Written Opinion mailed on Jun. 9, 2022, issued in connection with International Patent Application No. PCT/US2022/071233, filed on Mar. 21, 2022, 9 pages.
Li, Shutao, "Image Fusion with Guided Filtering," IEEE Transactions on Image Processing, Jul. 2013, pp. 2864-2875, Vo. 22, No. 7.
Simonyan et al., "Very Deep Convolutional Networks for Large-Scale Image Recognition," ICLR, arXiv:1409.1556v6, Apr. 10, 2015, 14 pages.

* cited by examiner

POLARIZED IMAGE ENHANCEMENT USING DEEP NEURAL NETWORKS

CROSS-REFERENCE TO RELATED APPLICATIONS

This application claims priority to a national stage application under 35 U.S.C. § 371 of International Application No. PCT/US2022/071233, filed Mar. 21, 2022, which claims priority to U.S. Provisional Patent Application No. 63/166,203, filed on Mar. 25, 2021, which is hereby incorporated by reference in its entirety.

BACKGROUND

Polarization imaging offers numerous benefits, not only in detecting object geometry and surface, but also in measuring physical properties that may not be detectable using conventional imaging. However, polarization information generally depends on a direction of a light source, and it may be challenging to directly use a polarized image for object detection and recognition applications in certain light environments. Accordingly, there is a need for extracting and utilizing polarization information to enhance a polarized image.

SUMMARY

In one aspect, a computing device may be configured to extract and utilize polarization information to enhance a polarized image.

In a first aspect, a computer-implemented method is provided. The method includes determining, by a computing device, a polarization characterization for a polarized image, wherein the polarization characterization is indicative of polarization data associated with a plurality of polarization directions of incident light in the polarized image. The method includes extracting, by the computing device and from the polarized image, a first collection of global features and a second collection of local features. The method also includes performing, by the computing device and based on the polarization characterization, a global feature fusion to fuse global features in the first collection, and a local feature fusion to fuse local features in the second collection. The method additionally includes compositing, by the computing device, the polarization characterization with the fused global features and the fused local features to generate a reconstructed image. The method also includes providing, by the computing device, the reconstructed image to an image processing resource to perform one or more image processing tasks.

In a second aspect, a computing device is provided. The computing device includes one or more processors and data storage. The data storage has stored thereon computer-executable instructions that, when executed by the one or more processors, cause the computing device to perform operations. The operations may include receiving, by the computing device, the polarized image from a polarization sensor. The operations may further include determining, by the computing device, a polarization characterization for the polarized image, wherein the polarization characterization is indicative of polarization data associated with a plurality of polarization directions of incident light in the polarized image. The operations may also include extracting, by the computing device and from the polarized image, a first collection of global features and a second collection of local features. The operations may additionally include performing, by the computing device and based on the polarization characterization, a global feature fusion to fuse global features in the first collection, and a local feature fusion to fuse local features in the second collection. The operations may also include compositing the polarization characterization with the fused global features and the fused local features to generate a reconstructed image. The operations may additionally include providing the reconstructed image to an image processing resource to perform the one or more image processing tasks.

In a third aspect, a system is provided. The system may include a polarization sensor configured to receive incident light at a plurality of polarization directions. The system may also include a computing device configured to process a polarized image. The system may additionally include one or more processors. The system may also include data storage, where the data storage has stored thereon computer-executable instructions that, when executed by the one or more processors, cause the system to carry out operations. The operations may include receiving, by the computing device, the polarized image from the polarization sensor. The operations may further include determining, by the computing device, a polarization characterization for the polarized image, wherein the polarization characterization is indicative of polarization data associated with the plurality of polarization directions. The operations may also include extracting, by the computing device and from the polarized image, a first collection of global features and a second collection of local features. The operations may additionally include performing, by the computing device and based on the polarization characterization, a global feature fusion to fuse global features in the first collection, and a local feature fusion to fuse local features in the second collection. The operations may also include compositing the polarization characterization with the fused global features and the fused local features to generate a reconstructed image. The operations may additionally include providing the reconstructed image to the image processing resource to perform the one or more image processing tasks.

In a fourth aspect, an article of manufacture is provided. The article of manufacture may include a non-transitory computer-readable medium having stored thereon program instructions that, upon execution by one or more processors of a computing device, cause the computing device to carry out operations. The operations may include determining, by a computing device, a polarization characterization for a polarized image, wherein the polarization characterization is indicative of polarization data associated with a plurality of polarization directions of incident light in the polarized image. The operations may further include extracting, by the computing device and from the polarized image, a first collection of global features and a second collection of local features. The operations may also include performing, by the computing device and based on the polarization characterization, a global feature fusion to fuse global features in the first collection, and a local feature fusion to fuse local features in the second collection. The operations may additionally include compositing, by the computing device, the polarization characterization with the fused global features and the fused local features to generate a reconstructed image. The operations may further include providing, by the computing device, the reconstructed image to an image processing resource to perform one or more image processing tasks.

BRIEF DESCRIPTION OF THE FIGURES

Various example embodiments can be more completely understood in consideration of the following detailed description in connection with the accompanying drawings, in which.

DETAILED DESCRIPTION

Figure 1:
FIG. 1 depicts an example polarization sensor, in accordance with example embodiments.
Figure 1:
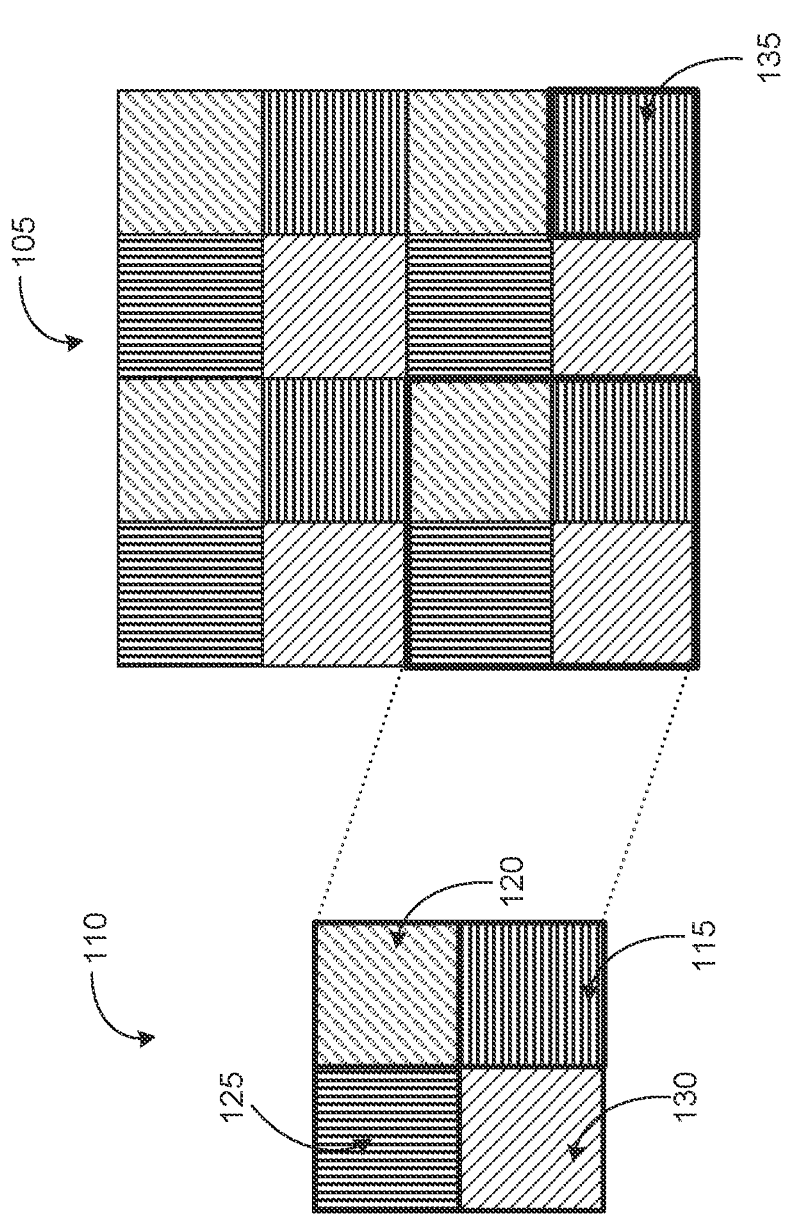

This disclosure describes inventive concepts with reference to specific examples. However, the intent is to cover all modifications, equivalents, and alternatives of the inventive concepts that are consistent with this disclosure. It will be apparent, however, to one of ordinary skill in the art that the present approach can be practiced without these specific details. Thus, the specific details set forth are merely exemplary, and is not intended to limit what is presently disclosed. The features implemented in one embodiment may be implemented in another embodiment where logically possible. The specific details can be varied from and still be contemplated to be within the spirit and scope of what is being disclosed.

Overview

Polarization imaging offers numerous benefits, such as detecting object geometry and surface features and also measuring physical properties that are not detectable using conventional imaging. However, polarization information may be impacted by the direction of the light source, and it may be difficult to use a polarized image for object detection and recognition, without additional enhancements. For example, images of outdoor scenes may be impacted because the angle of the sun may vary. Accordingly, there is a need for extracting and utilizing polarization information while enhancing the image in many such situations where the light source is not fixed.

A current imaging approach using a polarization sensor involves identifying information such as the degree of linear polarization or the angle of polarization and using this information as separated content. For outdoor applications, the behavior of polarization states can greatly vary depending on the angle of the light source. Using such information alone without other context makes the visual perception incomplete and difficult for object detection and recognition applications, particularly in low light conditions.

An alternative approach is to enhance the image content by fusing it with the polarization information. However, such methods primarily use the polarization magnitude relationship as the main feature to guide the fusion process without differentiating image structured and detailed content. This approach can cause undesirable results with artifacts when the polarization information is not matched with the image content. The optimal result for a scene is usually difficult to obtain.

The disclosed approach handles the problem differently. Described herein is a system and method with an image enhancement algorithm using deep neural networks that effectively improves the visual quality of polarized images. The system and method separate the image content with structured and detailed features based on guided filtering. Deep neural networks with a pre-trained AI model are used to analyze image features and combine the image content with polarization information adaptively. The algorithms can generate an enhanced and unified image from the polarization sensor with the necessity of visual information regardless of light conditions. In some embodiments, a camera that has micro-polarizers on each pixel of the image sensor can be used for capturing images. A polarization camera(s) can be used to demonstrate the effects of the enhancement algorithm.

In addition, the disclosed approach provides advantages because it is possible to enhance the object contrast and visibility in the image by selectively fusing the image intensity with the corresponding polarization information to obtain a composite image that has greater information content than the image directly obtained from the imaging sensor. A series of image processing algorithms including polarization characterization, image decomposition, global and local feature fusion, and image reconstruction, has been developed to process the fused polarized images. The algorithm relies on deep neural networks to detect the image features associated with polarization information from the image. Given these approaches, it is possible to produce an enhanced view of the image for a scene that contains objects with low and/or poor visibility.

The disclosed system and methods are for a polarized image enhancement algorithm using deep neural networks. The framework of algorithms consists of four processing components, including polarization characterization, image decomposition, global feature fusion, local feature fusion, and image reconstruction. In this framework, the polarization characterization component uses the Stokes vector method to measure the degree of linear polarization (DoLP) image and the total intensity image. The image decomposition component is used to decouple the global and local features from these two images, respectively. A weighted-averaging fusion method is applied for global features to preserve structure information, while a deep convolutional neural networks method is applied for local features to enhance detailed information. After that, the image reconstruction component combines all image features and produces an enhanced image as output.

Enhancement of Polarized Images

FIG. 1 depicts an example polarization sensor 100, in accordance with example embodiments. A polarized image enhancement algorithm using deep neural networks is described. The polarized images may be acquired from a sensor that incorporates a layer of polarizers above the photodiodes. Each polarizer array 105 may be comprised of a plurality of polarization angles. In some embodiments, the polarizer array 105 may be comprised of four different angled polarizers (90°, 45°, 135°, and 0°) which may be placed on each pixel, such as, for example, pixel 135. As illustrated in FIG. 1, each block of four pixels makes up a calculation unit for the polarization sensor 100. For example, polarizer array 105 is depicted with four blocks of four pixels. An example block 110 may include a first angled polarizer 115 corresponding to 0°, a second angled polarizer 120 corresponding to 45°, a third angled polarizer 125 corresponding to 90°, and a fourth angled polarizer 130 corresponding to 135°. With the help of polarizers, many material properties in a scene that was difficult to identify with conventional sensors can now be acquired. The particular arrangement of the angled polarizers (e.g., first angled polarizer 115, second angled polarizer 120, third angled polarizer 125, and fourth angled polarizer 130), shown in FIG. 1 is for illustrative purposes only. Additional, and/or alternative arrangements are possible. Also, as described herein, a number of angled polarizers and/or their respective angles may vary (e.g., based on a type of image processing application). For example, angles other than 90°, 45°, 135°, and 0° may be used. Also, for example, additional and/or alternative angles may be used.

For example, various embodiments may be directed to use of different numbers of polarization angles, such as a range of two angles to two hundred angles or more. The number of polarization angles used can be based on the specific application. Additionally, the design of the number angles may be empirically based. As a specific example, twelve different polarization angles may be used with varied intervals, such as angles of −10, 0, 10, 35, 45, 55, 80, 90, 100, 125, 135, and 140 degrees. As another example, seven different polarization angles are used with varied 15 intervals, such as angles of 0, 30, 60, 45, 90, 120, and 150 degrees. However, different numbers of polarization angles and different varied intervals (e.g., degrees and spacing between respective angles) can be used by an imaging device.

Figure 2:
FIG. 2 shows a block diagram depicting an overview of example algorithmic computing components, in accordance with example embodiments.
Figure 2:
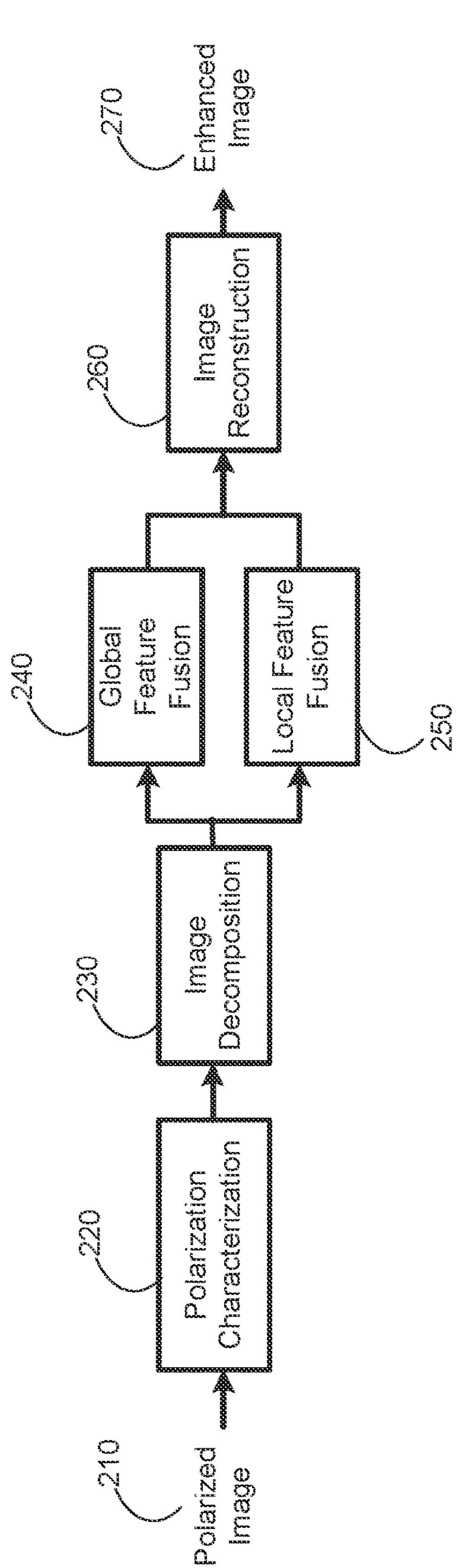

FIG. 2 shows a block diagram 200 depicting an overview of example algorithmic computing components, in accordance with example embodiments. The algorithms presented herein are post-processing to produce the enhancement results after polarized images 210 are captured from a polarization sensor. An example framework of algorithms shown in FIG. 2 consists of four processing components, including polarization characterization 220, image decomposition 230, global feature fusion 240, local feature fusion 250, and image reconstruction 260. In this framework, polarization characterization 220 uses the Stokes vector method to measure the degree of linear polarization (DoLP) image and the total intensity image. Image decomposition 230 is used to decouple the global and local features from these two images, respectively. Global feature fusion 240 is used to apply a weighted-averaging fusion method for global features to preserve structure information. Local feature fusion 250 is used to apply a deep convolutional neural networks method for local features to enhance detailed information. Subsequently, image reconstruction 260 combines the image features and generates an enhanced image 270 as output.

Polarization Characterization

Some embodiments described herein involve determining a polarization characterization for a polarized image. The polarization characterization may be indicative of polarization data associated with a plurality of polarization directions of incident light in the polarized image. For example, polarization characterization 220 extracts the polarization information of the light from polarized image 210. Polarization characterization 220 may be based on utilizing light intensity to describe the polarization characteristics. In some embodiments, the polarization characteristics may be based on the Stokes vector method.

Figure 3:
FIG. 3 shows a block diagram depicting an example polarization characterization computing component, in accordance with example embodiments.
Figure 3:
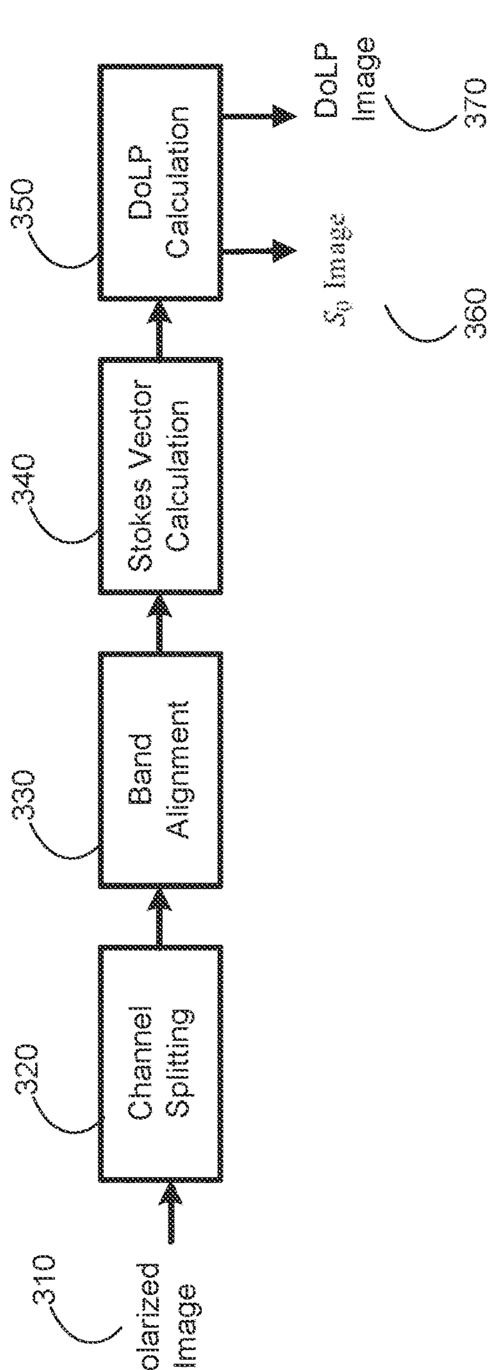

FIG. 3 shows a block diagram depicting an example polarization characterization 300, in accordance with example embodiments. In some embodiments, the determining of the polarization characterization involves generating, for the plurality of polarization directions, a corresponding plurality of channel images, by applying a channel splitting operation. The plurality of channel images may represent light intensities corresponding to the plurality of polarization directions. For example, channel splitting 320 may be performed to split the angle-polarized channels of an input polarized image 310 by applying a channel splitting function to form four different images, namely, $I_{90}$, $I_{45}$, $I_{135}$, and $I_0$ representing the light intensities corresponding to polarization directions of (90°, 45°, 135°, and 0°).

In some embodiments, among these four images, $I_{90}$, $I_{45}$, $I_{135}$, and $I_0$, a pixel shift problem may cause spatial clutter leakage typically comparable to or greater than polarized signals of interest. For example, each pixel (e.g., pixel 135 in array 105 of FIG. 1) may have a pixel shift. This may result in errors in the polarization characterization. Accordingly, band alignment 330 may apply a band alignment function to solve the pixel shift problem. For example, the band alignment function may align measurements to the center of each quad pixel based on Fourier domain phase shifts, and mirror the scene to force periodic data.

In some embodiments, Stokes vector calculation 340 may be performed. Generally, a Stokes vector, $S=[S_0, S_1, S_2]^T$ containing linear components may be used to describe a polarization state of a light wave. The polarization state may be measured by respective intensities of light corresponding to $I_{90}$, $I_{45}$, $I_{135}$, and $I_0$ as follows:

$$S = \begin{bmatrix} S_0 \\ S_1 \\ S_2 \end{bmatrix} = \begin{bmatrix} \frac{1}{2}(I_{90} + I_{45} + I_{135} + I_0) \\ I_0 - I_{90} \\ I_{45} - I_{135} \end{bmatrix} \quad \text{(Eqn. 1)}$$

where $S_0$ denotes the total intensity of radiation, $S_1$ denotes the intensity difference between vertically and horizontally polarized light waves, and $S_2$ denotes the intensity difference between two 45-polarized light waves. The function of Stokes vector calculation using Eqn. 1 derives three Stokes vector images.

Although the example above illustrates the technique based on four angles, any number of angles may be utilized. For example, the plurality of polarization angles may be $\varnothing_1$, $\varnothing_2$, . . . , $\varnothing_j$. Accordingly, the channel splitting function may be applied to form a corresponding plurality of different images, namely, $I_{\varnothing_1}$, $I_{\varnothing_2}$, . . . , $I_{\varnothing_j}$, representing the light intensities corresponding to polarization directions of $\emptyset_1$, $\emptyset_2$, . . . , $\emptyset_j$. Accordingly, a total intensity of the radiation may be determined as $$\frac{1}{2}\left(I_{\phi_1} + I_{\phi_2} + \ldots + I_{\phi_j}\right).$$

Also, for example, one or more pairwise differences may be determined between light intensities $I_{\emptyset_1}$, $I_{\emptyset_2}$, . . . , $I_{\emptyset_j}$, and a corresponding Stokes vector may be determined, as in Eqn. 1.

Figure 4:
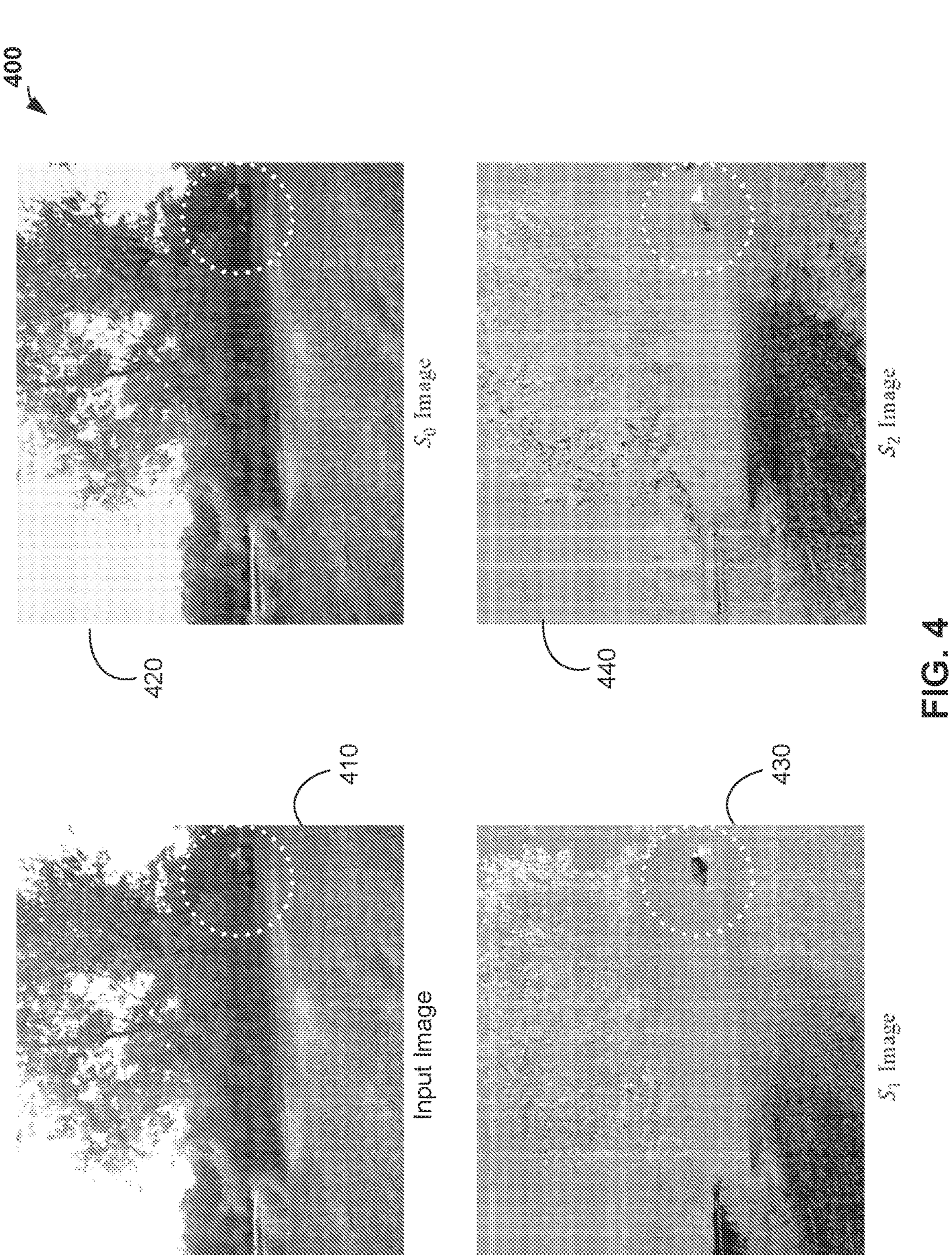
FIG. 4 depicts an example polarized image and associated Stokes vector images, in accordance with example embodiments.

FIG. 4 depicts images 400 including an example polarized image and associated Stokes vector images, in accordance with example embodiments. FIG. 4 shows an example of a polarized input image 410 that includes an image of a car, highlighted with a circle with a dashed boundary in each of images 400. The associated $S_0$ Image 420, $S_1$ Image 430, and $S_2$ Image 440 corresponding to the polarized input image 410 are shown. For illustration purposes, it may be noted that the size of the input image is four times larger than the Stokes vector images, but it may be resized to keep the same size as others. Also, $S_1$ Image 430, and $S_2$ Image 440 may be remapped and normalized with their minimum and maximum values, respectively.

Some embodiments also involve generating, based on the plurality of plurality of channel images, a degree of linear polarization (DoLP) image. For example, referring again to FIG. 3, subsequent to obtaining the polarization information of the light wave through measurement, the polarization information can be visualized using polarization degree images or polarization angle images. For example, a degree of linear polarization (DoLP) techniques may be performed by applying a DoLP calculation 350 using Eqn. 2:

$$DoLP = \frac{\sqrt{S_1^2 + S_2^2}}{S_0} \quad \text{(Eqn. 2)}$$

The DoLP calculation 350 generates intermediate images, $S_0$ Image 360 (e.g., $S_0$ Image 420 of FIG. 4), and DoLP image 370. Generally, DoLP image 370 indicates a property of linear polarization, such as a strength of polarization for each pixel. For example, a high polarization factor is associated with a higher light intensity (e.g., brighter regions). Also, for example, a low polarization factor is associated with a lower light intensity (e.g., darker regions).

Figure 5:
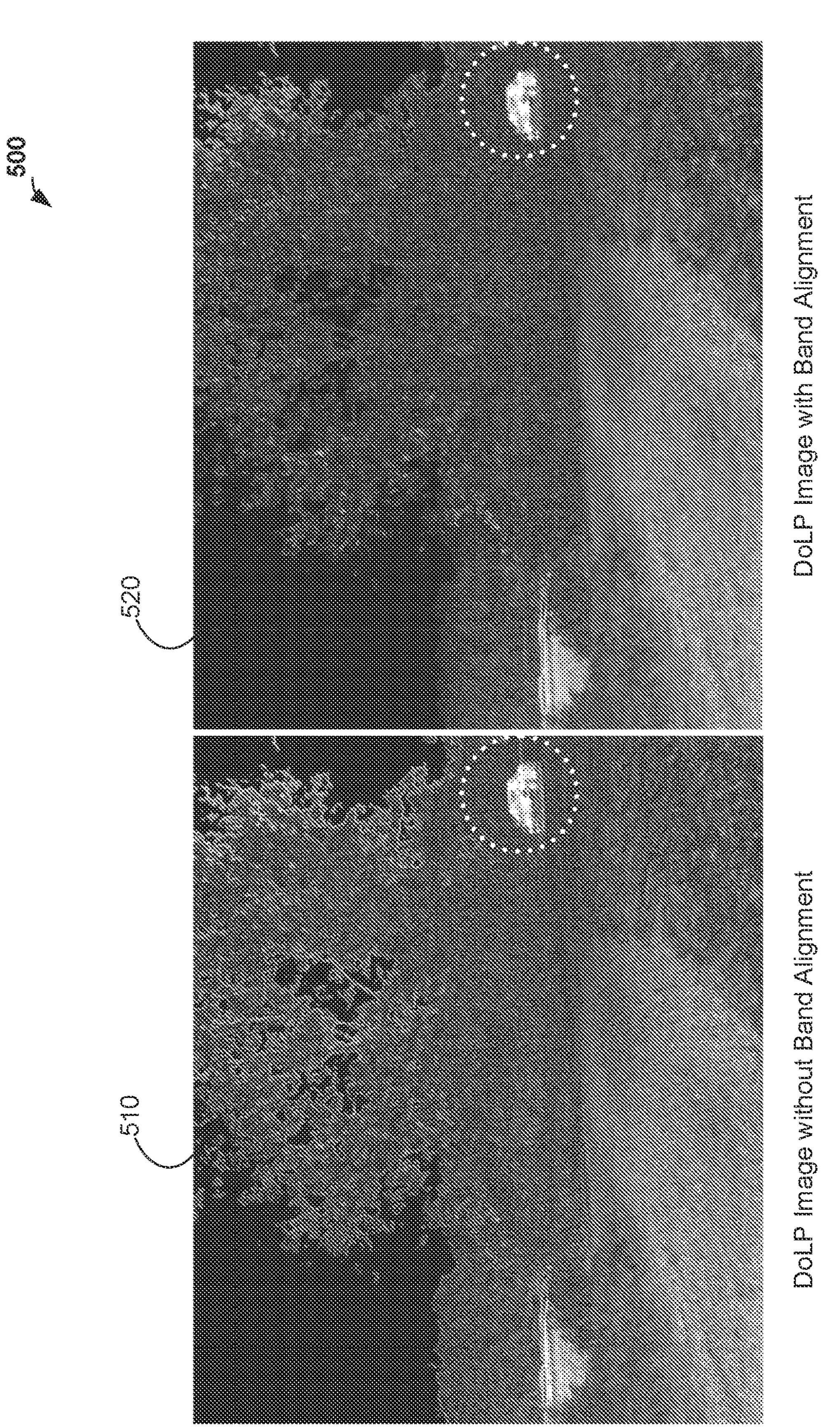
FIG. 5 depicts an example band alignment for polarization characterization, in accordance with example embodiments.

FIG. 5 depicts images 500 with an example band alignment for polarization characterization, in accordance with example embodiments. Two DoLP images with and without band alignment are shown for comparison in FIG. 5. For example, image 510 corresponds to a DoLP image without band alignment, and image 520 corresponds to a DoLP image with band alignment. The significance of the band alignment function is illustrated where the measurement noises are minimized, while maintaining the polarization signals unchanged for the object such as the image of a car, highlighted with a circle with a dashed boundary in each of images 500.

Image Decomposition

Some embodiments involve extracting, from the polarized image, a first collection of global features and a second collection of local features. For example, image decomposition 230 of FIG. 2 is designed to decompose the sources images, $S_0$ Image (e.g., $S_0$ Image 360 of FIG. 3, $S_0$ Image 420 of FIG. 4), and DoLP image (e.g., DoLP image 370 of FIG. 3), into different feature maps. Image decomposition may be performed using various techniques, such as, for example, wavelet, or latent low-rank decomposition. In some embodiments, a guided filtering technique may be used. Generally, guided filtering may be a comparatively more effective and efficient approach suitable for various object recognition tasks.

The source images may be denoted as $P_i$, where $i \in \{1, 2\}$, representing the $S_0$ Image and the DoLP image, respectively. For each source image $P_i$, guided filtering may be applied to separate the respective image content into global feature $$P_i^g$$

and local feature $$P_i^l,$$

where the superscript "g" denotes global, and the superscript "l" denotes local.

Eqn. 3 may be derived by solving an optimization problem to obtain the global feature $$P_i^g:$$

$$P_i^g = \underset{P_i^g}{\operatorname{argmin}} \|P_i - P_i^g\|_F^2 + \lambda\left(\|f_x * P_i^g\|_F^2 + \|f_y * P_i^g\|_F^2\right) \quad \text{(Eqn. 3)}$$

where $f_x=[-1\ 1]$ and $f_y=[-1\ 1]^T$ are the respective horizontal and vertical gradient operators. The penalty parameter $\lambda$ is a positive number that may be selected based on the application. For example, the parameter $\lambda$ may be tuned to determine an amount of global features that may be maintained from the input image. For example, a larger value of the parameter $\lambda$ may be selected to emphasize a higher presence of global features, and a smaller value of the parameter $\lambda$ may be selected to emphasize a lower presence of global features. For example, the image processing task may involve object detection in a darker region, and accordingly, a smaller value of the parameter $\lambda$ may be selected to emphasize a lower presence of global features, thereby highlighting the local features.

Subsequent to obtaining the global feature $$P_i^g,$$

the local feature $$P_i^l$$

may be obtained by subtracting $$P_i^g$$

from $P_i$ using Eqn. 4:

$$P_i^l = P_i - P_i^g \quad \text{(Eqn. 4)}$$

Figure 6:
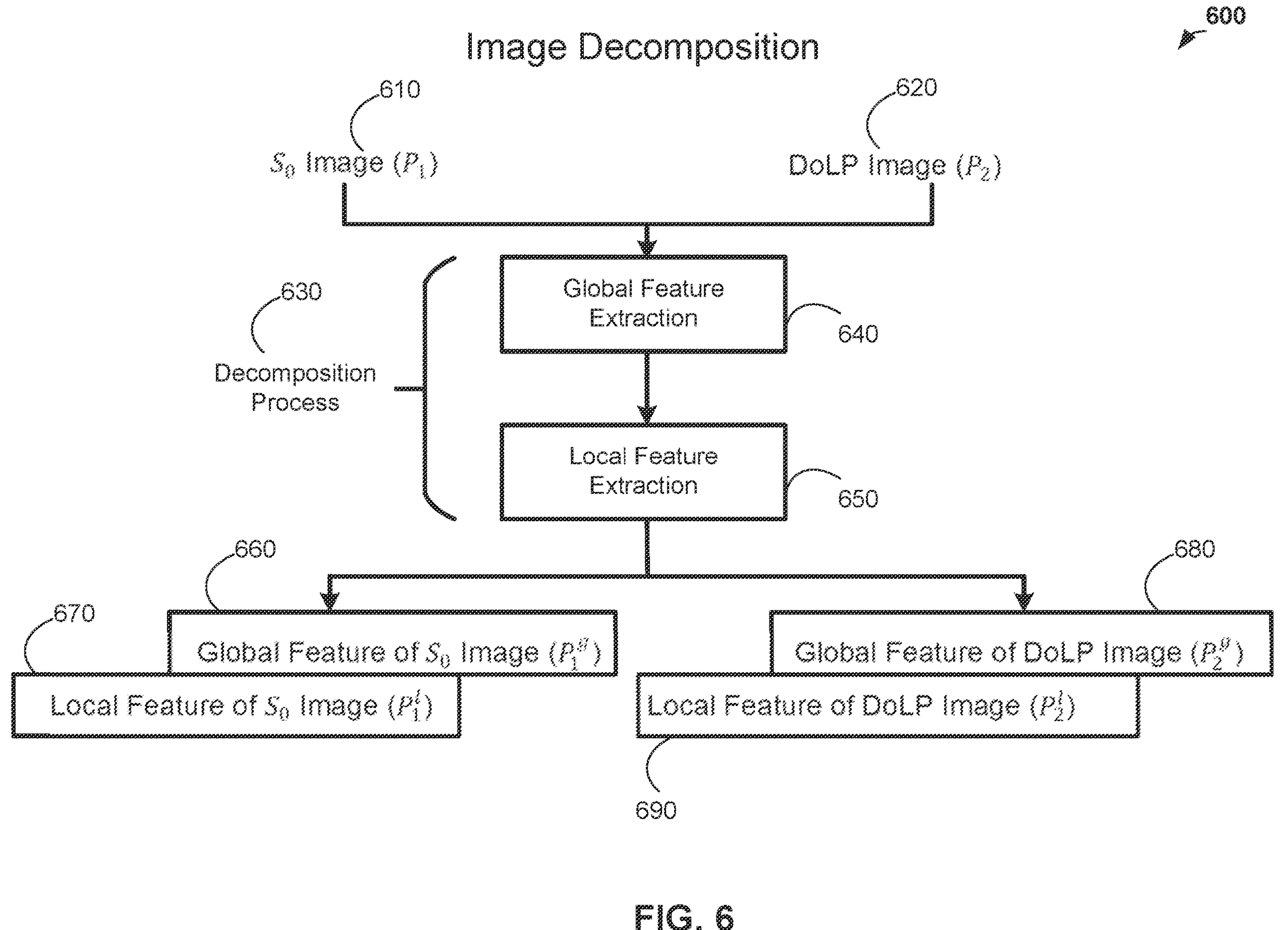
FIG. 6 depicts an example image decomposition, in accordance with example embodiments.

FIG. 6 depicts an example image decomposition 600, in accordance with example embodiments. Two source images, $S_0$ Image 610 represented by $P_1$, and DoLP image 620 represented by $P_2$, are shown. The image decomposition process 630 comprises extraction of global features 640 and extraction of local features 650. In some embodiments, decomposition process 630 may involve a guided filtering technique. As described herein, four feature images may be generated. For example, a first image 660 denoted as $$P_1^g$$

and representing the global features of $S_0$ Image 610 (represented by $P_1$), a second image 670 denoted as $$P_1^l$$

and representing the local features of $S_0$ Image 610 (represented by $P_1$), a third image 680 denoted as $$P_2^g$$

and representing the global features of DoLP image 620 (represented by $P_2$), and a fourth image 690 denoted as $$P_2^l$$

and representing the local features of DoLP image 620 (represented by $P_2$).

Global Feature Fusion

Generally, global features extracted from the source images represent common structures and some redundant information. Some embodiments involve performing, based on the polarization characterization, a global feature fusion to fuse global features in the first collection. For example, referring again to FIG. 2, global feature fusion 240 may fuse the global features extracted from the source images. In some embodiments, the performing of the global feature fusion involves applying a weighted average fusing to the global features in the first collection to preserve structural information in the polarized image. For example, a weighted-averaging strategy may be used to fuse the global features. A fused image $F_g$ representing fused global features may be determined by Eqn. 5:

$$F_g(x, y) = \alpha P_1^g(x, y) + \beta P_2^g(x, y) \quad \text{(Eqn. 5)}$$

where (x,y) denotes the corresponding position of the image intensity in $$P_1^g$$

(representing the global features of the $S_0$ Image), $$P_2^g$$

(representing the global features of the DoLP Image), and $F_g$ (representing the fused image formed by fusing the global features). The parameters α and β indicate weight values for the pixel in $$P_1^g \text{ and } P_2^g,$$

respectively. In some embodiments, the parameters α and β may be selected to balance between a preservation of the common structures in an image, and a reduction of the redundant information, based on an intended application.

Local Feature Fusion

Some embodiments involve performing, based on the polarization characterization, a local feature fusion to fuse local features in the second collection. For example, referring again to FIG. 2, local feature fusion 250 may fuse the content of local features from images $$P_1^l$$

(representing the local features of the $S_0$ Image), and $$P_2^l$$

(representing the local features of the DoLP Image). In some embodiments, a deep learning approach may be used to fuse the local features, and generate fused image $F_l$, the fused image formed by fusing the local features.

In some embodiments, the performing of the local feature fusion involves utilizing a neural network to adaptively fuse an image intensity associated with the polarized image and the polarization characterization for the polarized image.

Figure 7:
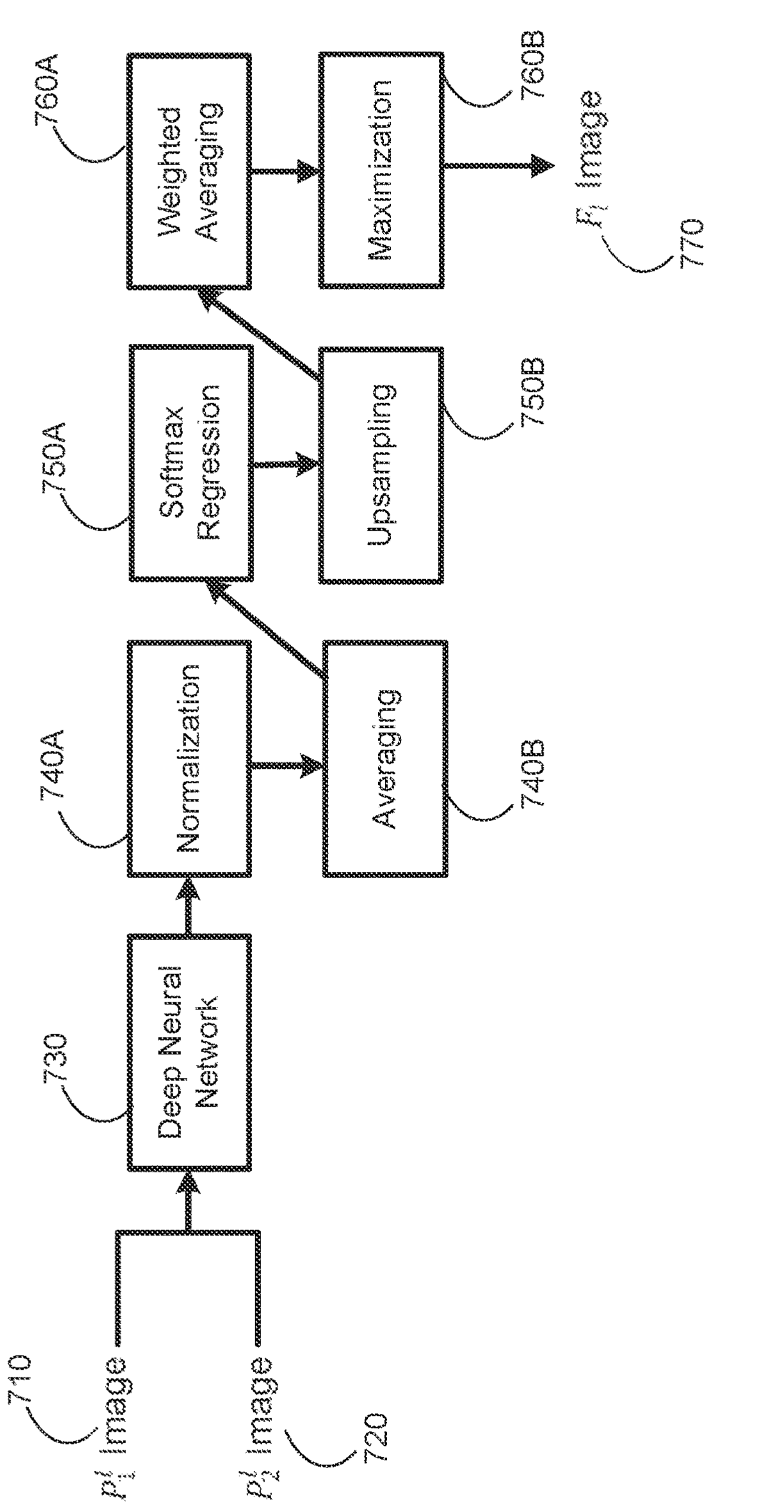
FIG. 7 illustrates an example local feature fusion, in accordance with example embodiments.

FIG. 7 illustrates an example local feature fusion 700, in accordance with example embodiments. Local feature fusion 700 may take, as input, $$P_1^l$$

image 710, and $$P_2^l$$

image 720. In some embodiments, a deep neural network 730 may be used to extract deep attributes from $P_1^l$ image 710, and $P_2^l$ image 720. Deep neural network 730 may be any neural network configured to take an input, apply a plurality of transformations to the input by passing it through multiple layers, and generating an output. Deep neural network 730 may be trained to fuse local features in an image. Some embodiments involve training neural network 730 with training data adapted to one or more image processing tasks. For example, deep neural network 730 may be trained based on a type of image processing task, such as object recognition, detecting reflective properties of materials, medical image analysis, and so forth.

Some embodiments may involve providing the image intensity associated with the polarized image and the polarization characterization for the polarized image. For example, deep neural network 730 may reside on a remote computing device, and input, $P_1^l$ image 710, and $P_2^l$ image 720 may be provided to deep neural network 730. Deep neural network 730 may fuse the local features from $P_1^l$ image 710, and $P_2^l$ image 720. Such embodiments also involve receiving the fused local features from the remote computing device. Also, for example, deep neural network 730 may reside on an edge device, such as, for example, a System-on-a Chip (SoC), and input, $P_1^l$ image 710, and $P_2^l$ image 720 may be provided to the edge device. Deep neural network 730 on the edge device may fuse the local features from $P_1^l$ image 710, and $P_2^l$ image 720. Such embodiments also involve receiving the fused local features from the edge device.

In some embodiments, an object recognition model such as a Visual Geometry Group (VGG) deep neural network may be utilized to extract deep attributes. Additional, and/or alternative deep neural networks may be applicable for local feature extraction. For example, a Residual Neural Network (ResNet), a convolutional neural network such as AlexNet, GoogLeNet, Inception network, DenseNet, MobileNet, EffecientNet, and so forth, may be applied to extract deep attributes.

In some embodiments, a multi-layer fusion strategy involving $L_1$ normalization and softmax regression may be applied to combine the weighted maps. The fused image $F_l$ may be reconstructed by these weight maps, and the content of local features using weighted averaging.

For illustrative purposes, deep neural network 730 may be a VGG network. Given $P_1^l$ image 710, and $P_2^l$ image 720, the attribute maps $Y_i^{m,n}$ of the i-th content of local feature may be extracted by the m-th convolutional layer in the VGG-network with the channel number n, where $n \in \{1, 2, \ldots, N\}$ and $N=64\times2^{m-1}$. The operation may be expressed in Eqn. 6:

$$Y_i^{m,n} = \Gamma_m(P_i^l) \quad \text{(Eqn. 6)}$$

where each $\Gamma_m(\cdot)$ denotes a layer in the VGG-network, and $m \in \{1, 2, 3, 4\}$ represents the number of the rectified linear unit (ReLU) function for the layer. For a pixel position (x,y), the content at position (x,y), may be represented as $Y_i^{m,n}(x, y)$.

Based on such notation, $$Y_i^{m1:N}(x, y)$$

is N-dimensional vector representing the deep attributes as the output from the VGG-network.

In some embodiments, normalization 740A may involve determining an activity level map $$A_i^m(x, y)$$

by applying an $L_1$-normalization based on Eqn. 7:

$$A_i^m(x, y) = \|Y_i^{m,1:N}(x, y)\|_1 \quad \text{(Eqn. 7)}$$

In some embodiments, the $L_1$-normalization may cause misregistration for fusion of local features. In such embodiments, an averaging 740 may be performed. For example, a block-based average operator may be utilized to determine a modified activity level map $$\overline{A_i^m},$$

based on in Eqn. 8:

$$\overline{A_i^m}(x, y) = \frac{\sum_{u=-S}^{S}\sum_{v=-S}^{S} A_i^m(x+u, y+v)}{(2s+1)^2} \quad \text{(Eqn. 8)}$$

where s represents the block size. When the block size s is larger, the local feature fusion process becomes more robust to misregistration. However, such a result may be at the cost of losing some detailed information. Accordingly, the block size s may be empirically selected based on the intended application.

In some embodiments, a softmax regression 750A may be applied to modified activity level map $$\overline{A_i^m},$$

to determine a weight map $$W_i^m$$

using Eqn. 9:

$$W_i^m(x, y) = \frac{\overline{A_i^m}(x, y)}{\sum_{k=1}^{i} \overline{A_k^m}(x, y)} \quad \text{(Eqn. 9)}$$

where i denotes a number of activity level maps. In some embodiments, there may be two source images, such as $$P_1^l$$

image 710, and $$P_2^l$$

image 720, and the value of i=2 may be selected. The value of the weight map $$W_i^m(x, y)$$

may be in the range of [0, 1].

Generally, a VGG-network may include a pooling operator that may correspond to a subsampling method. In some embodiments, the pooling operator may resize the attribute maps by a factor of 1/r of the original size. The parameter r may represent a stride of the pooling operator. In some embodiments, in the VGG-network, the value of r may be selected as 2. Accordingly, the size of the attribute maps in different layers may become $\frac{1}{2}^{m-1}$ times the size of the source image. To correct this, an upsampling 750B may be performed on the weight map $$W_i^m(x, y)$$

to match the size of the source image, before a fusion function is applied.

In some embodiments, there may be four pairs of weight maps $$W_i^m$$

where $i \in \{1, 2\}$ and $m \in \{1, 2, 3, 4\}$. In such embodiments, the fused image $$F_l^m$$

for the m-th convolutional layer in the VGG-network may be determined by a weighted averaging 760A of the input $$P_i^l$$

image with $$W_i^m$$

as shown in Eqn. 10:

$$F_l^m = \sum_{k=1}^{i} P_k^i \times W_k^m,\ i = 2 \quad \text{(Eqn. 10)}$$

In some embodiments, a maximization 760B may be applied to $$F_l^m$$

to derive the $F_l$ image 770 representing the fused local features. In some embodiments, maximization 760B may be based on Eqn. 11:

$$F_l(x, y) = \max[F_l^m(x, y) \mid m \in \{1, 2, 3, 4\}] \quad \text{(Eqn. 11)}$$

Image Reconstruction

Some embodiments may involve compositing the polarization characterization with the fused global features and the fused local features to generate a reconstructed image. For example, referring again to FIG. 2, image reconstruction 260 may reconstruct an enhanced image 270 by combining the global feature image $F_g$ with the local feature image $F_l$. In some embodiments, a sharpening filter S may be applied for the combination to retrieve some information that may have been smoothed out in the previous components of FIG. 2. In some embodiments, enhanced image 270 may be determined based on Eqn. 12:

$$F(x, y) = [F_g(x, y) + F_l(x, y)] * S(x, y) \quad \text{(Eqn. 12)}$$

Experimental Results

In some embodiments, a polarization sensor with 2448×2048 pixels (5 mega pixels (MP)) may be used to collect sample images. Also, for example, the VGG-network for local feature fusion may be a pre-trained model with 19 weight layers. However, four layers may be selected to extract deep attributes. For example, the four layers may be ReLU_1_1, ReLU_2_1, ReLU_3_1, and ReLU_4_1, respectively.

Some embodiments may involve determining a tuning parameter for an optimization algorithm to extract the first collection of global features. The tuning parameter may be indicative of a relevance of the first collection of global features in the one or more image processing tasks. For example, parameters may be selected to control a level fusion for visual appearance. Referring again to FIG. 2, in some embodiments, the penalty parameter λ may be set to 5 in Eqn. 3 for image decomposition 230. In some embodiments, the weight values α and β may be set to 0.5 in in Eqn. 5 for global feature fusion 240. Also, for example, the block size s may be set to 1 in Eqn. 8 for local feature fusion 250.

Figure 8:
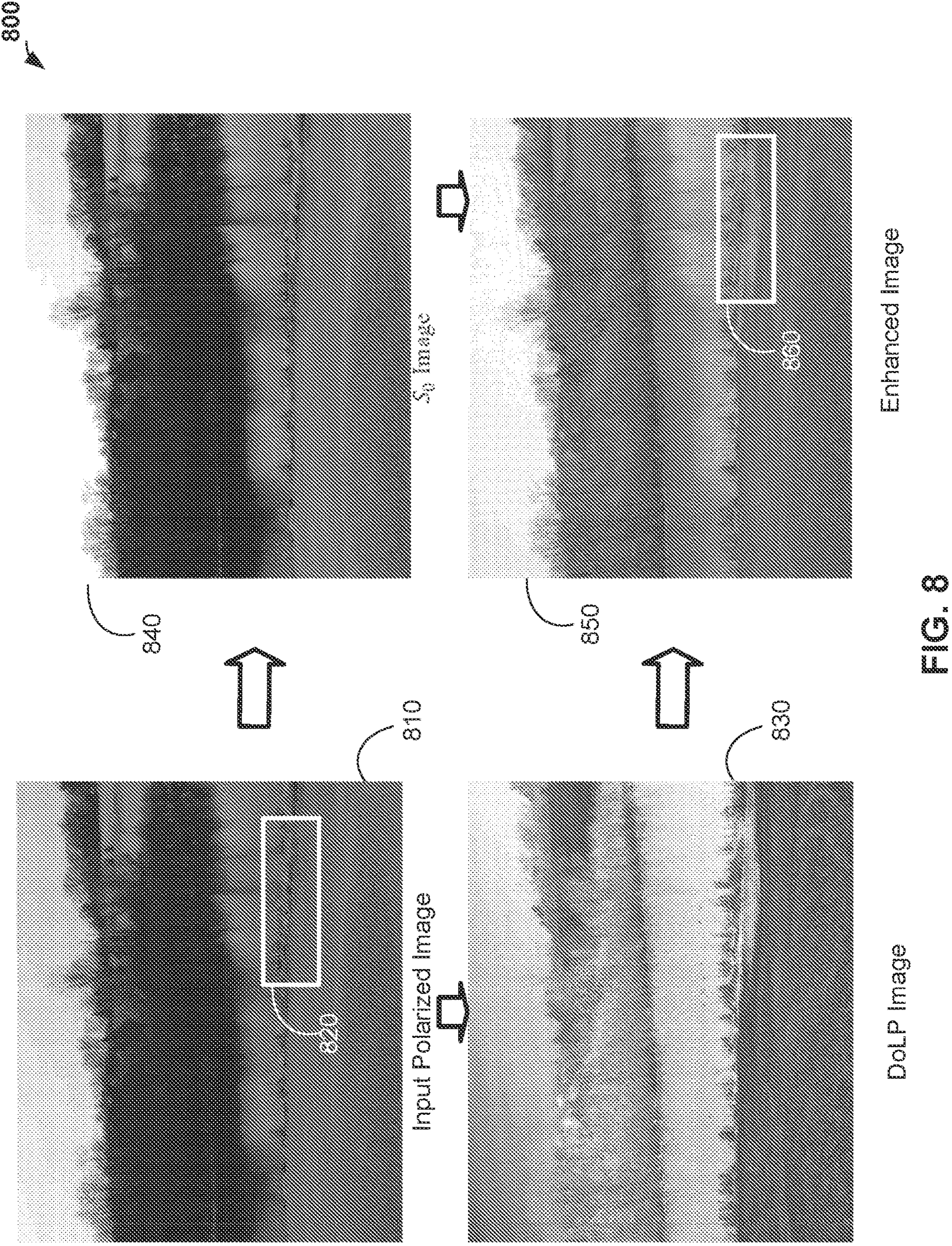
FIG. 8 illustrates an example polarized image, intermediate images, and an enhanced image, in accordance with example embodiments.

FIG. 8 illustrates an example polarized image, intermediate images, and an enhanced image, in accordance with example embodiments. FIG. 8 illustrates the experimental results of natural scene images processed by the techniques described herein. A polarization characterization for input polarized image 810 was determined to generate DOLP image 830 and $S_0$ image 840. Subsequently, image decomposition was performed to extract a first collection of global features and a second collection of local features. Global feature fusion and local feature fusion was applied to the resulting images to output enhanced image 850. As shown, the algorithms utilize the polarization information to enhance the visible information such that the hidden objects/scenes (e.g., a puddle region highlighted with a bounding box 820) that was not obvious in the input polarized image 810, is rendered more observable in the enhanced image 850, as indicated by a clearer image of enhanced puddle region within bounding box 860.

Figure 9:
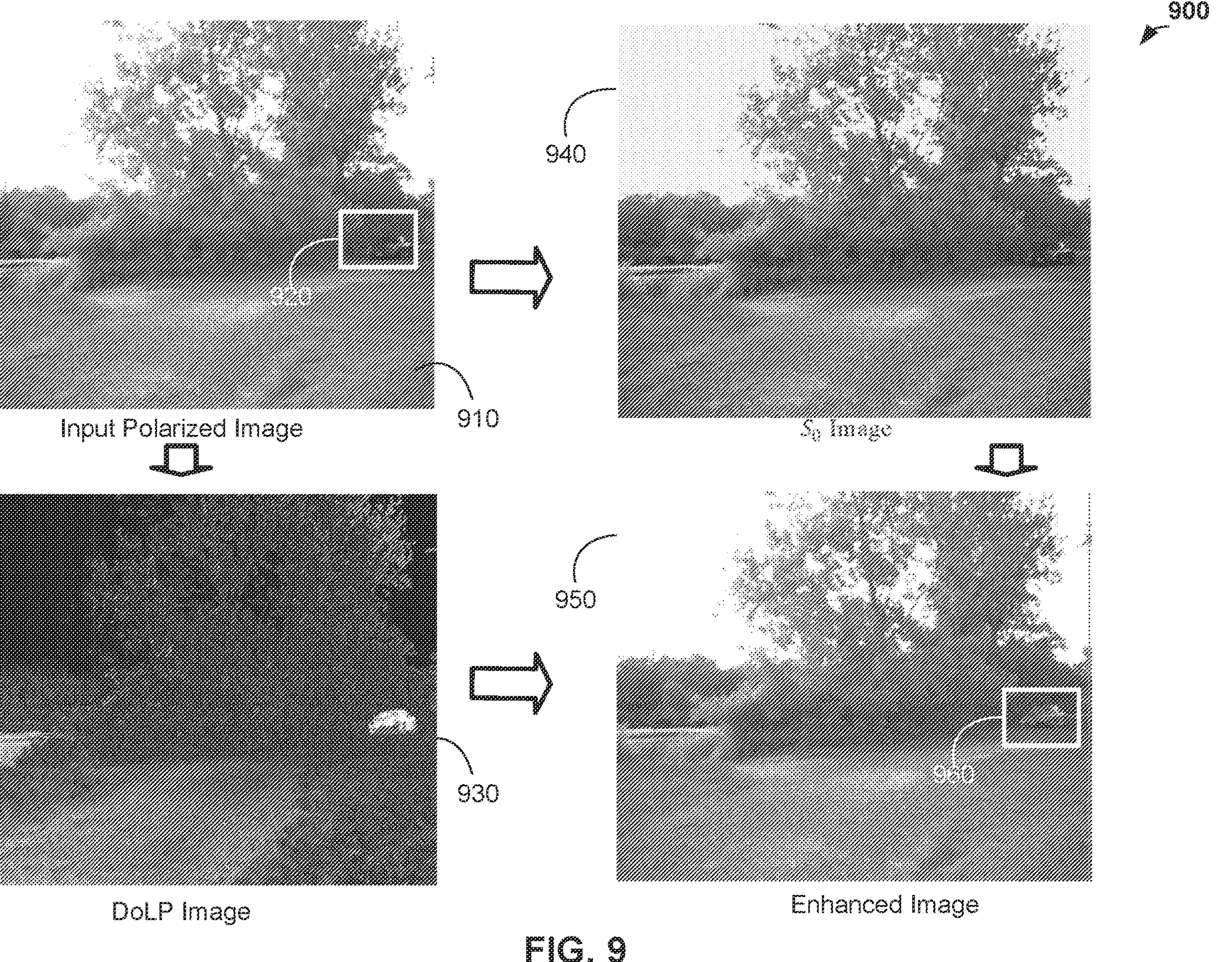
FIG. 9 illustrates another example polarized image, intermediate images, and an enhanced image, in accordance with example embodiments.

FIG. 9 illustrates another example polarized image, intermediate images, and an enhanced image, in accordance with example embodiments. FIG. 9 illustrates the experimental results of natural scene images processed by the techniques described herein. A polarization characterization for input polarized image 910 was determined to generate DOLP image 930 and $S_0$ image 940. Subsequently, image decomposition was performed to extract a first collection of global features and a second collection of local features. Global feature fusion and local feature fusion were applied to the resulting images to output enhanced image 950. As shown, the algorithms utilize the polarization information to enhance the visible information such that the hidden objects/scenes (e.g., a region with a car highlighted with a bounding box 920) that was not obvious in the input polarized image 910, is rendered more observable in the enhanced image 950, as indicated by a clearer image of enhanced region with a car highlighted with bounding box 960.

Example Applications

This invention is generally applicable for computer vision tasks where the polarization sensor is used to improve object detection and recognition outdoors under challenging lighting conditions. It can benefit diverse industries, including aerospace, defense, transportation, agriculture, environment, and mining. The techniques disclosed result in better image quality and improved accuracy in object detection and recognition for various industrial applications. It can be simply measured by the performance improvement as compared with conventional camera systems.

Some embodiments involve providing the reconstructed image to an image processing resource to perform one or more image processing tasks. As described herein, polarization imaging offers numerous benefits, not only in detecting object geometry and surface, but also in measuring physical properties that may not be detectable using conventional imaging. For example, it may be challenging to use a polarized image for object detection and recognition applications in certain light environments, and the techniques described herein may be utilized to generate an enhanced, reconstructed image from a polarized image, prior to performing the one or more image processing tasks.

In some embodiments, the one or more image processing tasks may include one or more object detection or object recognition in the reconstructed image. Other related tasks may involve object location, image classification, and so forth. Object detection generally refers to a computer vision task of detecting objects in an image or a video. For example, referring to FIG. 8, the hidden objects/scenes (e.g., a puddle region highlighted with a bounding box 820) that was not obvious in the input polarized image 810, is rendered more observable in the enhanced image 850, as indicated by a clearer image of enhanced puddle region within bounding box 860. Also, for example, referring to FIG. 9, the hidden objects/scenes (e.g., a region with a car highlighted with a bounding box 920) that was not obvious in the input polarized image 910, is rendered more observable in the enhanced image 950, as indicated by a clearer image of the enhanced region with a car highlighted with bounding box 960.

Object recognition generally refers to a computer vision task of identifying objects in an image or a video. For example, the one or more image processing tasks may include recognizing a face, recognizing an object as a car, recognizing an object as a firearm, and so forth.

In some embodiments, the plurality of polarization directions may be determined based on the one or more image processing tasks. For example, the computing device may identify which of the different polarization angles of the polarizers results in areas of interest of the image being in focus, and provides feedback to the control circuitry (e.g., of the polarization sensor, camera, etc.) to revise the image data collected based on the areas of interest being in focus. The revision can include identification of a subset of the plurality of different polarization angles, such that subsequent images can be captured faster and using less processing resources as compared to capturing the images using the plurality of different polarization angles.

In some embodiments, the image processing resource may be a component of an autonomous vehicle control system for an autonomous vehicle, and the computing device may be communicatively linked to the autonomous vehicle control system. For example, the image processing resource may include one or more cameras installed on an autonomous vehicle. The one or more cameras may be polarized cameras, and/or polarization sensors may be removably attached to the one or more cameras. In some embodiments, each of the one or more cameras may be associated with a set of polarization angles, and two different cameras may be associated with two different sets of polarization angles. The computing device may be communicatively linked to the autonomous vehicle control system, and may process the captured images or polarized images, to generate reconstructed images that are utilized for object detection, anomaly detection, and/or recognition tasks. In some embodiments, the autonomous vehicle may be an unmanned aerial vehicle. For example, the autonomous vehicle may be a drone, or a satellite.

In some embodiments, the one or more image processing tasks may include detection of a hazardous road condition. For example, the one or more image processing tasks may include detection of black ice on the road. This is an especially challenging task in limited light environments, such as dimly lit portions of a road. Also, for example, hazardous road conditions may be related to a condition of a road, such as a pothole, a mudslide, a rockslide, and so forth.

In some embodiments, the image processing resource may be a component of a robotic control system, and the computing device may be communicatively linked to the robotic control system. For example, the image processing resource may be part of a robotic vision system, and the one or more image processing tasks may include detecting, recognizing, and/or locating objects in an environment of the robotic control system. The robotic control system may be configured to direct actions of a robotic device based on the one or more image processing tasks.

In some embodiments, the image processing resource may be a component of a camera, and the one or more image processing tasks may relate to an object in a field of view of the camera. For example, security cameras may perform one or more image processing tasks related to an object in a field of view of the camera. Also, for example, object tracking cameras may perform one or more image processing tasks related to an object in a field of view of the camera. As another example, cameras installed at an assembly line in a product manufacturing factory may perform one or more image processing tasks related to an object in a field of view of the camera.

Some embodiments may involve adjusting the local feature fusion based on a light reflection property of the object. For example, security cameras may perform object detection, anomaly detection, and/or object recognition tasks related to an object in a field of view of the security camera. For example, the security camera may be a camera at a security checkpoint, and the security camera may perform a task of detecting concealed weapons. Accordingly, the local feature fusion described herein may be based on a light reflection property of concealed weapons (e.g., reflective properties of metals). As another example, the camera may be installed at an assembly line in a product manufacturing factory, and the camera may perform a task of detecting the contents of containers on the assembly line. Accordingly, the local feature fusion described herein may be based on a light reflection property of the containers (e.g., reflective properties of the material, such as a transparent plastic bag).

For example, for a plastic bag inspection, a conventional sensor may be unable to sense the plastic bag due to a transparent light reflective property. Generally, for a transparent object, an estimation of a depth map may become inaccurate. Accordingly, an enhanced polarized image may be used to generate a better estimate for a depth map. Also, for example, such a better estimate for a depth map may enable 3-dimensional (3D) sensing, in addition to 2-dimensional (2D) sensing.

These examples are illustrative, but by no means intended to limit the range and scope of applications.

Example Machine Learning Models

Figure 10:
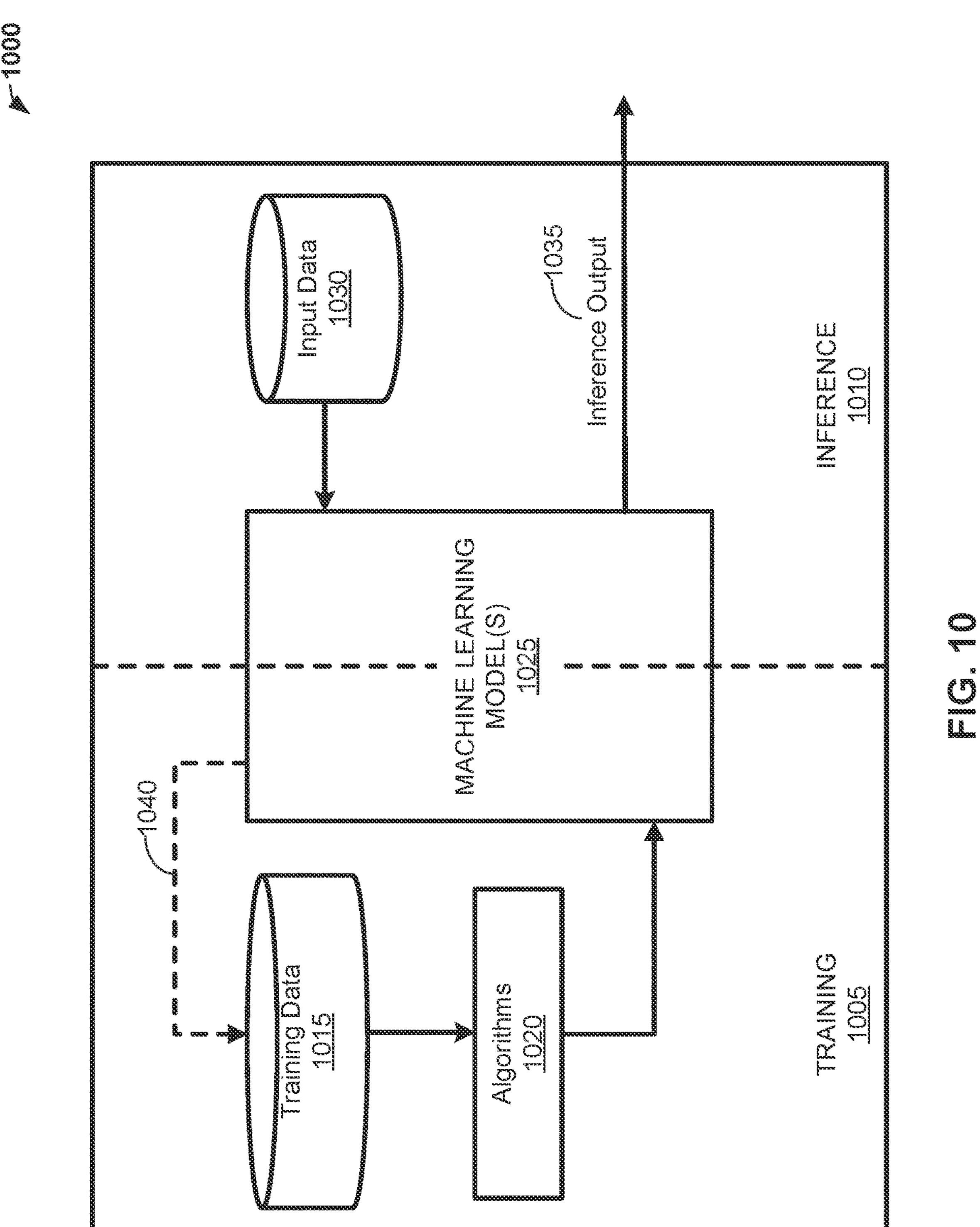
FIG. 10 shows a block diagram depicting training and inference phases for an example machine learning model, in accordance with example embodiments.

FIG. 10 shows a block diagram 1000 depicting training and inference phases for an example machine learning model, in accordance with example embodiments. As described herein, one or more machine learning models may be trained and deployed to perform the tasks. For example, deep neural network 730 of FIG. 7 may include a trained neural network to generate local features. Also, for example, the one or more image processing tasks may be performed by a trained machine learning model. Trained models may be used for object detection, image identification, anomaly detection, and so forth.

Block diagram 1000 includes a training phase 1005 and an inference phase 1010. Generally, machine learning models 1025 are trained during the training phase 1005 by using training data 1015. In some embodiments, machine learning models may be trained by utilizing one or more machine learning algorithms 1020 that are applied to training data 1015 to recognize patterns in the input data 1030 and output inferences 1035. Training data 1015, the one or more algorithms 1020, or both, may depend on a particular machine learning model, its expected functionality, a desired precision, a desired efficiency, a desired accuracy, available computing resources, and so forth. During the inference phase 1010, the trained machine learning models 1025 receive input data 1030 and generate predictions or an inference output 1035 about input data 1030. For example, deep neural network 730 may be trained to extract local features from an image. In some embodiments, deep neural network 730 may be trained based on a type of image processing task, such as object recognition, detecting reflective properties of materials, medical image analysis, and so forth.

In some embodiments, the identification of the locations of the areas of interest can be achieved and/or include, image preprocessing using a Common Objects in Context (COCO) dataset, object detection using Fast Region-Convolution Neural Network (R-CNN), and/or object segmentation using Mask R-CNN. Datasets such as COCO, Fast R-CNN, and/or Mask r-CNN, may be used. For example, COCO, Scene Understanding (SUN), ImageNet Large Scale Visual Recognition Competition (ILSVRC), Pattern Analysis Statistical Modelling and Computational Learning (PASCAL) Visual Object Classes (VOC) datasets and/or combinations thereof may be used for image preprocessing, such as augmentation and training. As another example, Faster R-CNN, You Only Look Once (YOLO), MobileNet, SqueezeDet, and/or Single Shot Detector (SSD) may be used for object detection and Mask R-CNN, U-Net, Gated Shape CNN, DeepLab, and/or Pyramid Scene Parsing Network (PSPNet) may be used for object segmentation.

Image preprocessing can include the use of a training set of annotations in sample images, such as via a training procedure using weighted models and a COCO dataset. The training set can be systematically modified for a plurality of different conditions (e.g., orientation, location, scale, brightness, etc.), which includes flipping, rotating, scaling, cropping and translation, and Gaussian noise applied to increase the dataset size. The training set can be augmented based on a particular application, such as for soft tissue (e.g., revised surgical scenes with blood occluded soft tissue or haze caused by surgical smoke and transfers based on Generative Adversarial Networks (GANs)) including transforming a training image from one domain to another domain (e.g., grab blood and mix it with another image that has soft tissue exposed).

Object detection can include the use of Faster R-CNN. For example, a feature map having candidate regions can be generated in polarized visible light (VIS) image frames and polarized NIR image frames using different size regions. Each candidate region can include a boundary of the respective image frame likely to contain a respective feature (e.g., object or part of the tissue). For each candidate region of the feature map, a classification and a probability of each candidate region containing the respective feature can be generated. Selections can be made for regions of interest from the candidate regions, based on the classification and the probability.

Object segmentation can include the use of Mask R-CNN. For example, image masks for the selected regions may be generated. The image masks hide portions of the image frames and reveal other portions that include the feature (e.g., set some of the pixel values to zero or a background value). In some specific embodiments, the image masks can be set to soft values, meaning that the pixel intensity is set to a value that depends on how much of an individual pixel is inside the mask.

As described herein, inference output 1035 may include a label associated with an incoming polarized image (based on a trained classifier). Also, for example, inference output 1035 may include a predicted classification and a predicted probability of each candidate region. In some embodiments, inference output 1035 may include the fused local feature represented by $F_l$ image 770. Also, for example, inference output 1035 may include an output of a feature detection system.

Algorithms 1020 may include, but are not limited to artificial neural networks (e.g., convolutional neural networks, recurrent neural networks, a Bayesian network, a hidden Markov model, a Markov decision process, a logistic regression function, a support vector machine, a statistical machine learning algorithm, and/or a heuristic machine learning system). Algorithms 1020 may involve supervised, unsupervised, semi-supervised, and/or reinforcement learning techniques. Machine learning models 1025 may involve deep learning networks, and/or convolutional neural networks, including, but not limited to, VGG, ResNet, AlexNet, GoogLeNet, Inception, DenseNet, MobileNet, EffecientNet, and so forth, or any combination thereof. In some embodiments, machine learning models 1025 may be updated based on the inference phase 1010, and training data 1015 may be updated via feedback loop 1040.

In some embodiments, machine learning models 1025 and/or algorithms 1020 may be located within one computing device, or in a shared computing environment (e.g., computing environment 1100). In some embodiments, machine learning models 1025 and/or algorithms 1020 may be a part of a distributed computing architecture, such as one or more cloud servers. Also, for example, machine learning models 1025 and/or algorithms 1020 may be located within an organization, such as a cybersecurity framework for an organization. In some embodiments, the training 1005 of the one or more machine learning models 1025 may be performed at a computing device that is different from a computing device where inference 1010 is performed. Also, for example, input data 1030 may be received at a first computing device, and provided to a second computing device that houses trained machine learning models 1025. The second computing device may then apply machine learning models 1025 to input data 1030, and generate inference output 1035. Subsequently, inference output 1035 may be provided to the first computing device. Generally, one or more components of FIG. 10 may be available as a platform, as an application programming interface (API), an application-specific integrated circuit (ASIC), as a service (e.g., Software as a Service (SaaS), Machine Learning as a Service (MLaaS), Analytics as a Service (AnaaS), Platform as a Service (PaaS), Knowledge as a Service (KaaS), and so forth.

Example Computing Environment

Figure 11:
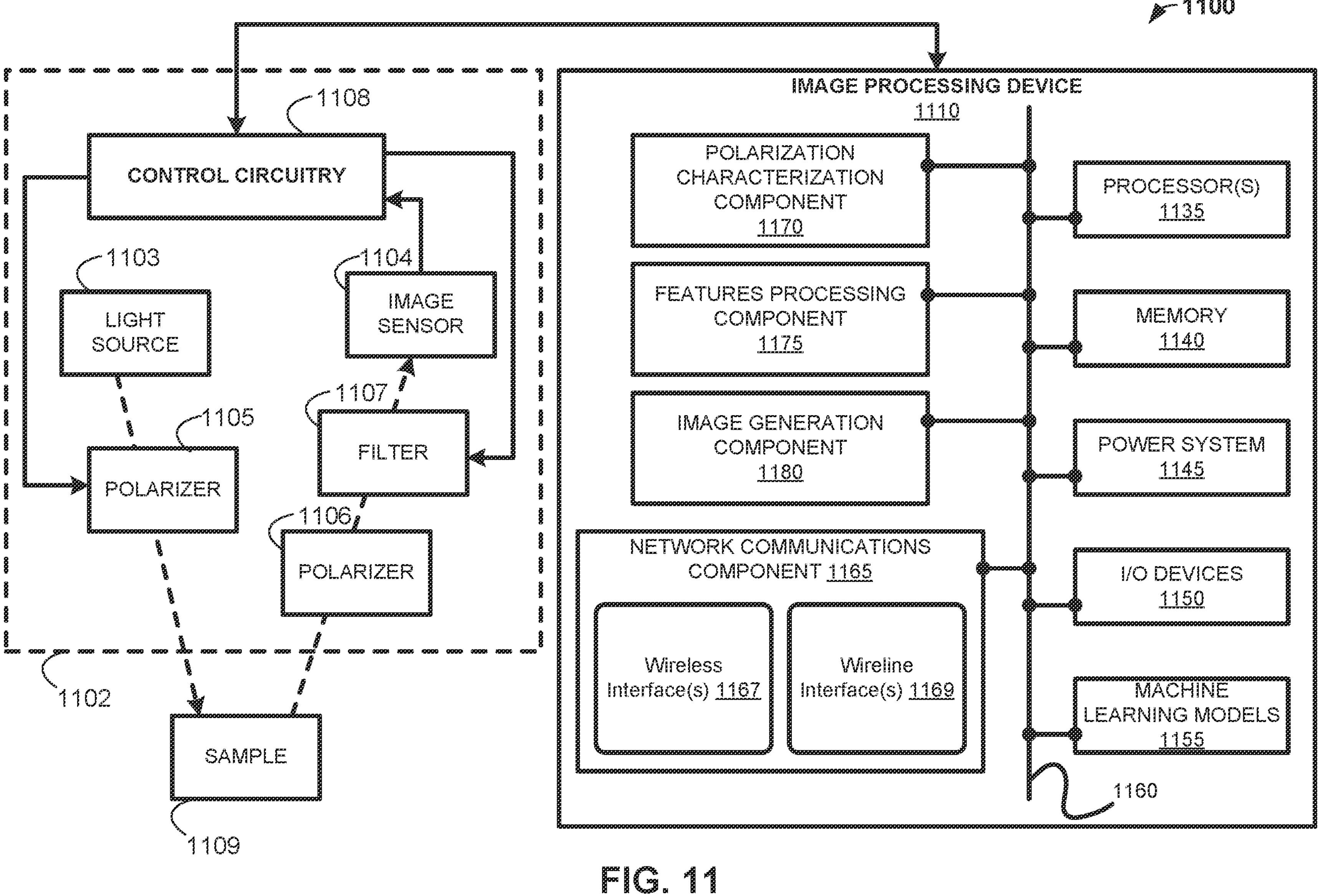
FIG. 11 is a block diagram of an example computing environment for image processing of a polarized image, in accordance with example embodiments.

FIG. 11 is a block diagram of an example computing environment 1100 for processing a polarized image, in accordance with example embodiments. In particular, computing environment 1100 shown in FIG. 11 can be configured to perform at least one function of and/or related to processing a polarized image.

Computing environment 1100 can include an imaging device 1102 that images a sample 1109 to generate a polarized image, and an image processing device 1110 that processes the polarized image to generate an enhanced image, as described herein. The imaging device 1102 includes a light source 1103 that outputs a light beam along an optical pathway. The light source 1103 can include a collimated light source, such as lasers, light emitting diodes (LEDs), and other light sources. The optical pathway can be from the light source 1103 toward the sample 1109 and reflected back to an image sensor 1104. The sample 1109 can include any object related to the one or more image processing tasks. For example, the sample 1109 can include or be a tissue sample, such as from a patient, in specific embodiments. Also, for example, the sample 1109 can be an object in a field of view of a satellite camera, a traffic camera, a security camera, a camera of an autonomous vehicle or a robotic device, and so forth.

Arranged along the optical pathway includes a first polarizer 1105 and a second polarizer 1106 which selectively pass light waves of a specific polarization and block light waves of other polarizations. The first polarizer 1105 can be coupled to the light source 1103, and passes first polarized light from the output light beam and toward the sample 1109 along the optical pathway. The second polarizer 1106 is along the optical pathway between the sample 1109 and the image sensor 1104, and passes the second polarized light from the reflected light and toward the image sensor 1104. The first and second polarizers 1105, 1106 can be linear and the first and second polarizations can cross one another, with either an orthogonal or slant direction. The first polarized light and second polarized light can be associated with a slant or angle (such as perpendicular in a specific embodiment) with respect to one another. In some embodiments, the polarization directions may be determined based on the one or more image processing tasks.

The first and second polarizers 1105, 1106 can have adjustable polarization angles, such that the polarizers can be adjusted or changed to different polarization angles with respect to one another. Some embodiments may involve an adjustment to the polarization angle for the polarization sensor. In some embodiments, the adjustment includes a physical rotation of the polarizers 1105, 1106. In other embodiments, the adjustment includes a change in the polarization angle caused by an electric field on a polarizer, sometimes referred to as electric polarization. The polarization angle, in such embodiments, can be changed to any specific degree with a strength and direction of the electric field.

A filter 1107 is arranged along the optical pathway, and selectively passes the reflected light in a visible light range and a near-infrared range (NIR) toward the image sensor 1104. The filter 1107 can include a notch filter or a bandpass filter. As a specific example, the filter 1107 includes a first bandpass filter to selectively pass visible light or wavelengths and a second bandpass filter to selectively pass NIR light or wavelengths. In further embodiments and/or in addition, the filter 1107 can include a notch or bandpass filter to selectively block incident light and a color filter array used to capture NIR, red, green, and blue channels. In various specific embodiments, computing environment 1100 can further include a motorized rotator arranged with the first and second bandpass filters, and the control circuitry 1108 selectively rotates the motorized rotator such that one of the first and second bandpass filters are arranged in the optical pathway to selectively pass one of the visible light and NIR light ranges or wavelengths. Example filters include a visible band filter, such as a 400-700 nm filter or a 410-690 nm filter, and a NIR 15 band filter, such as a 715-2500 nm filter or a 715-1100 nm filter.

The image sensor 1104, which includes circuitry, collects light reflected from the sample 1109 in response to the passed first polarization light and second polarization light in the visible and/or NIR light range or wavelengths. As further described herein, a plurality of images can be captured at each of the visible light range and the NIR light range, and while the first and second polarizers 1105, 1106 are at different angles. The image sensor 1104 can include a multichannel sensor, such as a multi-channel camera.

The imaging device 1102 further includes control circuitry 1108 arranged with the image sensor 1104 and the first and second polarizers 1105, 1106 to control imaging of the sample 1109. The control circuitry 1108 can cause the first polarizer 1105 and the second polarizer 1106 to adjust to the different polarization angles with respect to one another, and to collect image data of the sample 1109 from the reflected light while the first and second polarizers 1105, 1106 are at the different polarization angles with respect to one another and while the filter 1107 selectively passes the visible light and the NIR light ranges of the second polarized light. In specific embodiments, the control circuitry 1108 causes the first polarizer 1105 and the second polarizer 1106 to adjust to the different polarization angles, resulting in optical reflections of birefringence from portions of the tissue sample to be focused or discriminated when aligned to a polarization of collimated incident light.

In various embodiments, a plurality of NIR images and a plurality of visible light images, using different angled polarized light, can be collected. The control circuitry 1108 can sequence through the different polarization angles for NIR images followed by visible light images, and in other embodiments, can collect an NIR image and a visible light image (prior to rotating to different polarized angles) and sequences through the different polarization angles. The number of different polarization angles sequenced through can vary across different embodiments and specific implementations. For example, a range of polarization angles can be used, such as a range of at least two angles and up to two hundred angles, although embodiments are not so limited and may include more angles, such as five hundred angles.

In some embodiments, the imaging device 1102 can adjust the number of polarization angles. For example, the number of polarization angles can be changed by the imaging device 1102 in real time, such as through an optimization process. More polarization angles may allow for better visualization and/or imaging of the object, such as in a sample, while resulting in greater computation time for processing the images. The optimum number of polarization angles can be dependent on the particular object(s) being imaged and/or the application, and may be changed for imaging different object(s). In other embodiments, the control circuitry 1108 collects the image data by collecting a sequential order of image frames responsive to the first and second polarizers 1105, 1106 being at the different polarization angles with respect to one another, and while the filter 1107 selectively and sequentially passes both the NIR and visible light ranges.

Computing environment 1100 can include image processing device 1110 coupled to the imaging device 1102. The image processing device 1110 can be used to fuse the plurality of images together (e.g., to generate a polarized image). For example, the image processing device 1110 generates an NIR image frame and a visible light image frame from the image data collected while the first and second polarizers 1105, 1106 are at the different polarization angles and fuses the NIR image frame and visible light image frame into a single image view. In various embodiments, a plurality of NIR image frames and visible light image frames are captured and fused together. The image processing device 1110 can provide feedback to the control circuitry 1108. For example, the image processing device 1110 identifies which of the different polarization angles of the first and second polarizers 1105, 1106 results in areas of interest of the sample 1109 (e.g., particular soft tissue, particular object) being in focus, and provides feedback to the control circuitry 1108 to revise the image data collected based on the areas of interest being in focus. The revision can include identification of a subset of the plurality of different polarization angles, such that subsequent images can be captured faster and using less processing resources as compared to capturing the images using the plurality of different polarization angles.

Image processing device 1110 can include one or more processors or processing units 1135 to execute instructions, one or more memories 1140 to store information, one or more data input components or I/O devices 1150 to receive data input from a user of a computing device associated with image processing device 1110, one or more components that include a polarization characterization component 1170, features processing component 1175, image generation component 1180, a network communications component 1165 to establish a communication link to communicate with other computing devices external to the image processing device 1110, one or more machine learning models 1155 to perform various functions as described herein, one or more sensors (not shown in FIG. 11) where an output from the sensors is used for sensing a specific triggering condition and then correspondingly generating one or more preprogrammed actions, a display screen (not shown in FIG. 11) to display at least some of the information stored in the one or more memories 1140 and other components.

In some embodiments, portions of this design implemented in software may be stored in the one or more memories 1140 and executed by the one or more processors 1135. The image processing device 1110 may have one or more processing cores, which couples to a system bus 1160 that couples various system components including the system memory 1140. The system bus 1160 may be any of several types of bus structures selected from a memory bus, an interconnect fabric, a peripheral bus, and a local bus using any of a variety of bus architectures.

Some embodiments involve receiving, by image processing device 1110, a polarized image from a polarization sensor (e.g., imaging device 1102) configured to collect the incident light at the plurality of polarization directions. In some embodiments, the polarization sensor may be at least one of a component of a polarization camera or configured to be removably attached to a camera. In some embodiments, image processing device 1110 may include a polarization camera, and the polarization sensor may be a component of the polarization camera.

Some embodiments involve recommending, based on the reconstructed image, an adjustment to an automatic image capture setting for a camera associated with the polarization sensor. For example, the image processing device 1110 identifies which of different image capture settings (e.g., focal length, brightness, background or foreground light, light direction, light intensity, aperture settings, and so forth) results in areas of interest of the image being in focus, and provides feedback to the camera to revise the automatic image capture setting based on the areas of interest being in focus.

Image processing device 1110 may include a polarization characterization component 1170, which may perform operations similar to polarization characterization 220 of FIG. 2. Also, for example, image processing device 1110 may include features processing component 1175, which may perform operations similar to image decomposition 230, global feature fusion 240, and/or local feature fusion 250 of FIG. 2. As another example, image processing device 1110 may include image generation component 1180, which may perform operations similar to image reconstruction 260 of FIG. 2. Image processing device 1110 also includes machine learning model(s) 1155, which may perform operations similar to machine learning models described with reference to FIG. 10, and/or deep neural network 730 of FIG. 7.

It should be noted that the present system and methods can be carried out on a computing device. However, the present design can be carried out on a server, a computing device devoted to message handling, or on a distributed system in which different portions of the present design are carried out on different parts of the distributed computing system. In some embodiments, the polarized image may be generated by imaging device 1102. In some embodiments, the polarized image may be generated by image processing device 1110. Also, for example, the polarized image may be generated by a computing device separate from imaging device 1102 and image processing device 1110, but communicatively coupled to both.

One or more processors 1135 can include one or more general-purpose processors, and/or one or more special-purpose processors (e.g., digital signal processors, graphics processing units (GPUs), application-specific integrated circuits, etc.). One or more processors 1135 can be configured to execute computer-readable instructions that are contained in memory 1140 and/or other instructions as described herein.

Memory 1140 can include one or more non-transitory computer-readable storage media that can be read and/or accessed by at least one of one or more processors 1135. The one or more computer-readable storage media can include volatile and/or non-volatile storage components, such as optical, magnetic, organic or other memory or disc storage, which can be integrated in whole or in part with at least one of one or more processors 1135. In some examples, memory 1140 can be implemented using a single physical device (e.g., one optical, magnetic, organic or other memory or disc storage unit), while in other examples, memory 1140 can be implemented using two or more physical devices.

Image processing device 1110 typically includes a variety of computing machine-readable media. Machine-readable media can be any available media that can be accessed by image processing device 1110 and includes both volatile and nonvolatile media, and removable and non-removable media. By way of example, and not limitation, computing machine-readable media use may include storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the image processing device 1110. Machine-readable media typically embody computer readable instructions, data structures, and other executable software.

In an example, the volatile memory can store portions of the operating system, application programs, other executable software, and program data.

Power system 1145 can include one or more batteries and/or one or more external power interfaces for providing electrical power to image processing device 1110. One or more external power interfaces of power system 1145 can include one or more wired-power interfaces, such as a USB cable and/or a power cord, that enable wired electrical power connections to one or more power supplies that are external to image processing device 1110.

Input/output devices 1150 may include storage devices, a receiver, a transmitter, a speaker, a display, an image capturing component, an audio recording component, a user input device (e.g., a keyboard, a mouse, a microphone), and so forth. Although not shown in FIG. 11, one or more of I/O devices 1150 may be a device external to image processing device 1110. Such an external device may communicate with image processing device 1110 via a wired or wireless connection, and such communication may be facilitated by an I/O interface of image processing device 1110.

A user may enter commands and information into the image processing device 1110 through I/O devices 1150 such as a keyboard, touchscreen, or software or hardware input buttons, a microphone, a pointing device and/or scrolling input components, such as a mouse, trackball or touch pad. The microphone can cooperate with speech recognition software. These and other input devices may be connected to the one or more processors 1135 through a user input interface that is coupled to the system bus 1160, but may be connected by other interface and bus structures, such as a lighting port, game port, or a universal serial bus (USB). A display monitor or other type of display screen device can also be connected to the system bus 1160 via an interface, such as a display interface. In addition to the monitor, image processing device 1110 may also include other peripheral output devices such as speakers, a vibration device, and other output devices, which may be connected through an output peripheral interface.

Network communications component 1165 can include one or more devices that provide one or more wireless interfaces 1167 and/or one or more wireline interfaces 1169 that are configurable to communicate via a network. Wireless interface(s) 1167 can include one or more wireless transmitters, receivers, and/or transceivers, such as a Bluetooth™ transceiver, a Wi-Fi™ transceiver, an LTE™ transceiver, and/or other type of wireless transceiver configurable to communicate via a wireless network. Wireline interface (s) 1169 can include one or more wireline transmitters, receivers, and/or transceivers, such as an Ethernet transceiver, a Universal Serial Bus (USB) transceiver, or a similar transceiver configurable to communicate via a physical connection to a wireline network.

Network communications component 1165 can be configured to provide reliable, secured, and/or authenticated communications between various components. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information). Communications can be made secure (e.g., be encoded or encrypted) and/or decrypted/decoded using one or more cryptographic protocols and/or algorithms, such as, but not limited to, a secure sockets protocol such as Secure Sockets Layer (SSL), and/or Transport Layer Security (TLS).

The image processing device 1110 can operate in a networked environment using logical connections to one or more remote computers/client devices, such as a remote computing system. The remote computing system can be a personal computer, a mobile computing device, a server, a router, a network PC, a peer device or other common network node, and typically includes many or all of the elements described above relative to the image processing device 1110. The logical connections can include a personal area network (PAN) (e.g., Bluetooth®), a local area network (LAN) (e.g., Wi-Fi), and a wide area network (WAN) (e.g., cellular network), but may also include other networks such as a personal area network (e.g., Bluetooth®). Such networking environments are commonplace in offices, enterprise-wide computer networks, intranets and the Internet. A browser application and/or one or more local apps may be resident on the computing device and stored in the memory.

When used in a LAN networking environment, the image processing device 1110 is connected to the LAN through a network interface, which can be, for example, a Bluetooth® or Wi-Fi adapter. When used in a WAN networking environment (e.g., Internet), the image processing device 1110 typically includes some means for establishing communications over the WAN. With respect to mobile telecommunication technologies, for example, a radio interface, which can be internal or external, can be connected to the system bus via the network interface, or other appropriate mechanisms. In a networked environment, other software depicted relative to the computing device, or portions thereof, may be stored in the remote memory storage device. By way of example, and not limitation, remote application programs may reside on a remote computing device. It will be appreciated that the network connections described herein are examples and other means of establishing a communications link between the computing devices that may be used.

Example Computer-Readable Medium

Figure 12:
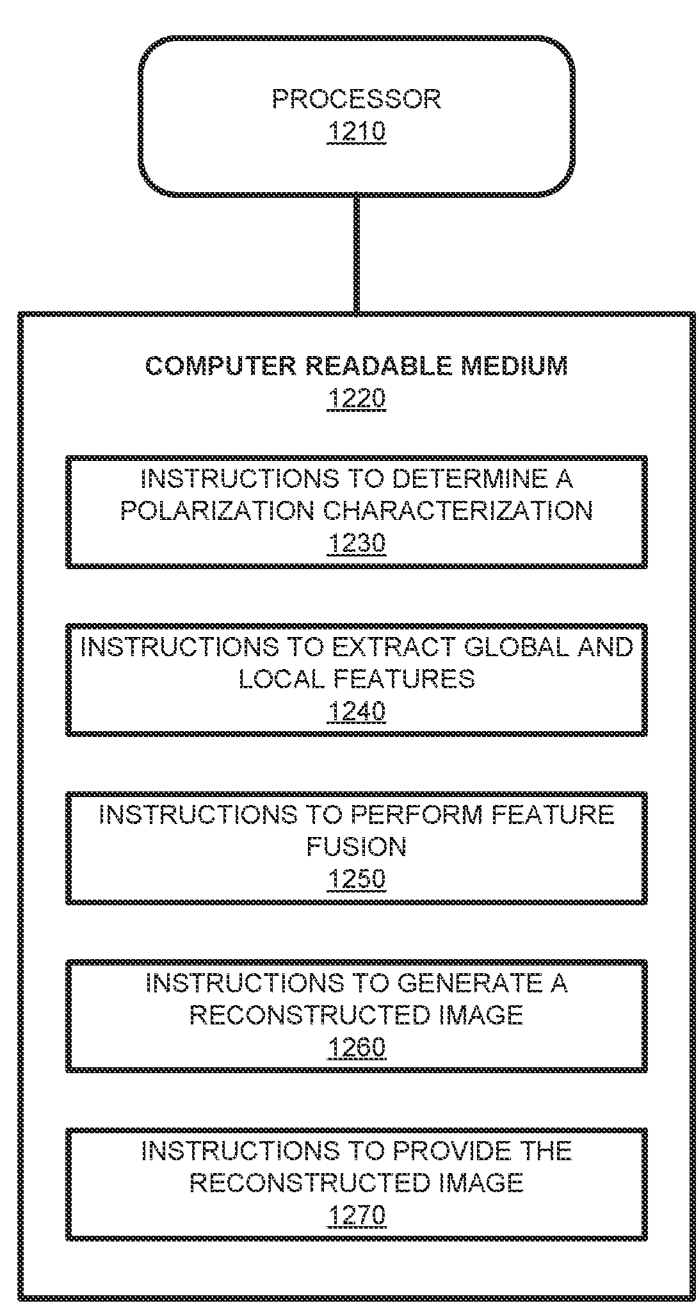
FIG. 12 is a block diagram of an example computing device including non-transitory computer-readable medium storing executable code, in accordance with example embodiments.

FIG. 12 is a block diagram of an example computing device 1200 including non-transitory computer-readable medium storing executable code, in accordance with example embodiments. The computing device 1200, in accordance with embodiments herein, includes an image processing device, such as illustrated by image processing device 1110 of FIG. 11.

The computing device 1200 has processing circuitry, such as the illustrated processor 1210, and computer readable medium 1220 storing a set of instructions 1230, 1240, 1250, 1260, and 1270. The computer readable medium 1220 can, for example, include ROM, RAM, EEPROM, Flash 15 memory, a solid state drive, and/or discrete data register sets.

At 1230, the computing device 1200 can determine a polarization characterization for a polarized image. The polarization characterization may be indicative of polarization data associated with a plurality of polarization directions of incident light in the polarized image.

At 1240, the computing device 1200 extracts, from the polarized image, a first collection of global features and a second collection of local features.

At 1250, the computing device 1200 performs, based on the polarization characterization, a global feature fusion to fuse global features in the first collection, and a local feature fusion to fuse local features in the second collection.

At 1260, the computing device 1200 composites the polarization characterization with the fused global features and the fused local features to generate a reconstructed image.

At 1270, the computing device 1200 provides the reconstructed image to an image processing resource to perform one or more image processing tasks.

In a number of specific embodiments, the computing device 1200 can provide feedback to an image sensor used to collect the image data based on the single composite image. The feedback can include data indicative of a subset of the plurality of different polarization angles of the illumination light and imaging light. The subset can, for example, include an optimized set of angles of polarization for the illumination light and the imaging light based on the single composite image and object segmentation. The computing device 1200 can provide the feedback data to the image sensor used to collect the image data by tracking changes in feature characteristics (e.g., orientation, size, aspect ratio, surface texture, compactness, etc.) using the reconstructed image.

Example Method of Operation

Figure 13:
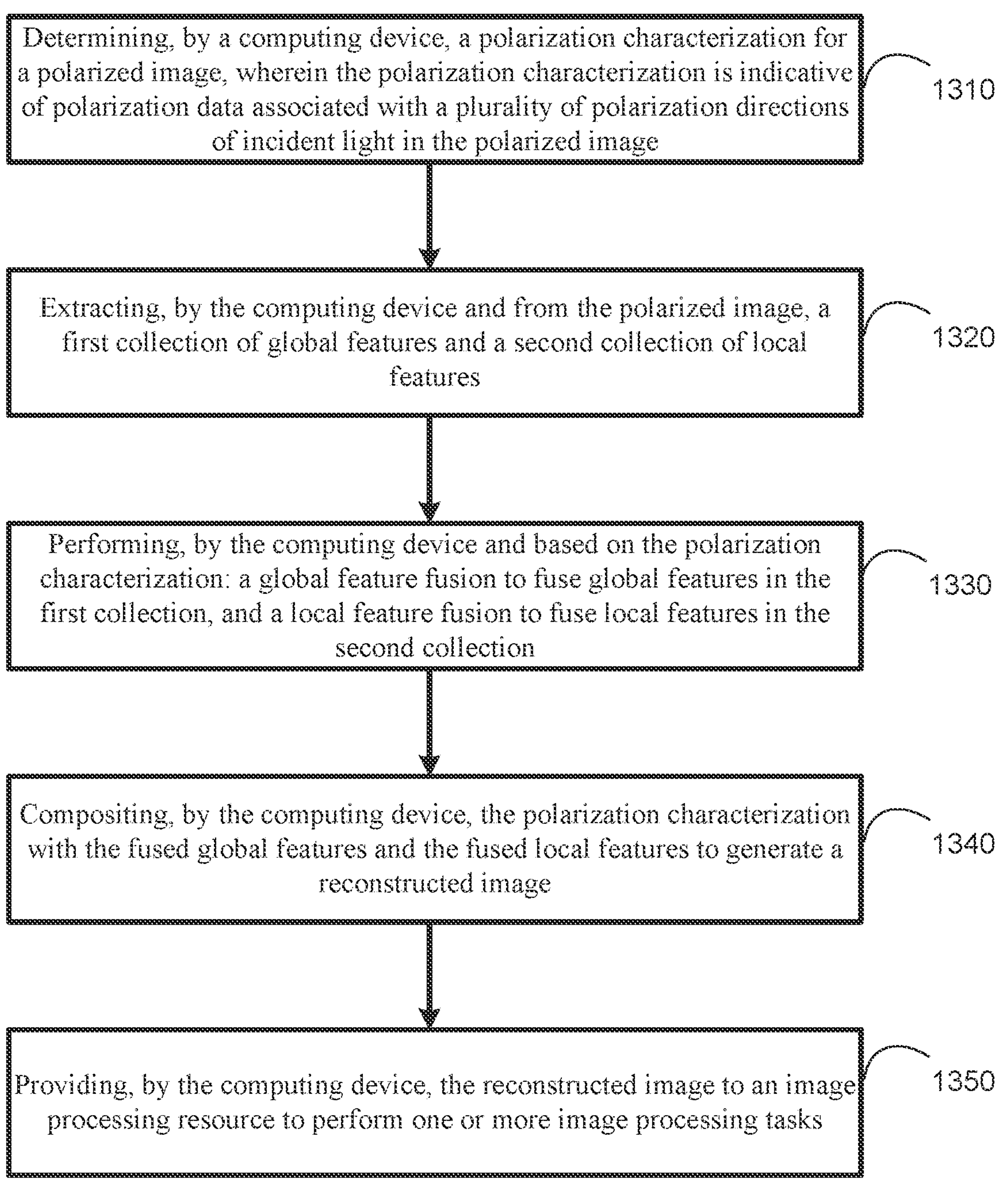
FIG. 13 illustrates a flowchart, in accordance with example embodiments.

FIG. 13 illustrates a flowchart, in accordance with example embodiments. Method 1300 may include various blocks or steps. The blocks or steps may be carried out individually or in combination. The blocks or steps may be carried out in any order and/or in series or in parallel. Further, blocks or steps may be omitted or added to method 1300.

The blocks of method 1300 may be carried out by various elements of image processing device 1110 of FIG. 11, and/or computing device 1200 of FIG. 12.

Block 1310 involves determining, by a computing device, a polarization characterization for a polarized image, wherein the polarization characterization is indicative of polarization data associated with a plurality of polarization directions of incident light in the polarized image.

Block 1320 involves extracting, by the computing device and from the polarized image, a first collection of global features and a second collection of local features.

Block 1330 involves performing, by the computing device and based on the polarization characterization: a global feature fusion to fuse global features in the first collection, and a local feature fusion to fuse local features in the second collection.

Block 1340 involves compositing, by the computing device, the polarization characterization with the fused global features and the fused local features to generate a reconstructed image.

Block 1350 involves providing, by the computing device, the reconstructed image to an image processing resource to perform one or more image processing tasks.

In some embodiments, the performing of the local feature fusion involves utilizing a neural network to adaptively fuse an image intensity associated with the polarized image and the polarization characterization for the polarized image.

Some embodiments involve training the neural network with training data adapted to the one or more image processing tasks.

Some embodiments involve providing the image intensity associated with the polarized image and the polarization characterization for the polarized image. Such embodiments also involve receiving the fused local features.

In some embodiments, the performing of the global feature fusion involves applying a weighted average fusing to the global features in the first collection to preserve structural information in the polarized image.

In some embodiments, the determining of the polarization characterization involves generating, for the plurality of polarization directions, a corresponding plurality of channel images, by applying a channel splitting operation, wherein the plurality of channel images represent light intensities corresponding to the plurality of polarization directions. Such embodiments also involve generating, based on the plurality of plurality of channel images, a degree of linear polarization (DoLP) image.

Some embodiments involve receiving, by the computing device, the polarized image from a polarization sensor configured to collect the incident light at the plurality of polarization directions. In some embodiments, the polarization sensor may be at least one of a component of a polarization camera or configured to be removably attached to a camera. In some embodiments, the computing device may include a polarization camera, and the polarization sensor may be a component of the polarization camera. Some embodiments involve recommending, based on the reconstructed image, an adjustment to an automatic image capture setting for a camera associated with the polarization sensor.

In some embodiments, the one or more image processing tasks may include one or more of object detection or object recognition in the reconstructed image.

In some embodiments, the plurality of polarization directions may be determined based on the one or more image processing tasks.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information and/or comparison of signals can correspond to circuitry that can be configured to perform the specific logical functions of a herein-described method or technique. Alternatively or additionally, a step or block that represents a processing of information and/or comparison of signals can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

As described herein, the computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, HTTP, Java, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A component may be implemented in hardware electronic components, software components, and a combination of both.

Generally, application includes programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

As described herein, the proposed algorithms demonstrate an improvement of visual quality using polarization imaging. The technologies described herein can be integrated with other deep learning approaches as a framework for object detection, recognition, and classification. The technologies described herein greatly amplify the advantages of a polarization sensor over a conventional vision sensor, thereby making the polarization sensor more suitable for applications with challenging lighting conditions, such as autonomous driving, security surveillance, aerial tracking, assembly line inspection, and so forth.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method for processing a polarized image, comprising:

determining, by a computing device, a polarization characterization for a polarized image, wherein the polarization characterization is indicative of polarization data associated with a plurality of polarization directions of incident light in the polarized image;

extracting, by the computing device and from the polarized image, a first collection of global features and a second collection of local features, wherein the extraction is performed using a guided filtering technique;

performing, by the computing device and based on the polarization characterization:

a global feature fusion to fuse global features in the first collection, and a local feature fusion to fuse local features in the second collection by utilizing a neural network to adaptively fuse an image intensity associated with the polarized image and the polarization characterization for the polarized image;

compositing, by the computing device, the polarization characterization with the fused global features and the fused local features to generate a reconstructed image; and providing, by the computing device, the reconstructed image to an image processing resource to perform one or more image processing tasks.

2. The method of claim 1, further comprising:

training the neural network with training data adapted to the one or more image processing tasks.

3. The method of claim 1, further comprising:

providing the image intensity associated with the polarized image and the polarization characterization for the polarized image; and receiving the fused local features.

4. The method of claim 1, wherein the performing of the global feature fusion comprises:

applying a weighted average fusing to the global features in the first collection to preserve structural information in the polarized image.

5. The method of claim 1, wherein the determining of the polarization characterization further comprises:

generating, for the plurality of polarization directions, a corresponding plurality of channel images, by applying a channel splitting operation, wherein the plurality of channel images represent light intensities corresponding to the plurality of polarization directions; and generating, based on the plurality of channel images, a degree of linear polarization (DoLP) image.

6. The method of claim 1, further comprising:

receiving, by the computing device, the polarized image from a polarization sensor configured to collect the incident light at the plurality of polarization directions.

7. The method of claim 6, wherein the polarization sensor is at least one of a component of a polarization camera or configured to be removably attached to a camera.

8. The method of claim 6, wherein the computing device comprises a polarization camera, and wherein the polarization sensor is a component of the polarization camera.

9. The method of claim 6, further comprising:

recommending, based on the reconstructed image, an adjustment to an automatic image capture setting for a camera associated with the polarization sensor.

10. The method of claim 1, wherein the one or more image processing tasks comprises of one or more of object detection or object recognition in the reconstructed image.

11. The method of claim 1, wherein the plurality of polarization directions are determined based on the one or more image processing tasks.

12. A computing device for processing a polarized image, comprising:

one or more processors; and data storage, wherein the data storage has stored thereon computer-executable instructions that, when executed by the one or more processors, cause the computing device to perform operations comprising:

receiving, by the computing device, the polarized image from a polarization sensor configured to collect incident light at a plurality of polarization directions;

determining, by the computing device, a polarization characterization for the polarized image, wherein the polarization characterization is indicative of polarization data associated with the plurality of polarization directions of the incident light in the polarized image;

extracting, by the computing device and from the polarized image, a first collection of global features and a second collection of local features;

performing, by the computing device and based on the polarization characterization:

a global feature fusion to fuse global features in the first collection, and a local feature fusion to fuse local features in the second collection;

compositing, by the computing device, the polarization characterization with the fused global features and the fused local features to generate a reconstructed image;

providing, by the computing device, the reconstructed image to an image processing resource to perform one or more image processing tasks; and recommending, based on the reconstructed image, an adjustment to an automatic image capture setting for a camera associated with the polarization sensor.

13. The computing device of claim 12, wherein the operations for the performing of the local feature fusion further comprise:

utilizing a neural network to adaptively fuse an image intensity associated with the polarized image and the polarization characterization for the polarized image.

14. The computing device of claim 13, the operations further comprising:

training the neural network with training data adapted to the one or more image processing tasks.

15. The computing device of claim 13, wherein the operations for the determining of the polarization characterization further comprise:

generating, for the plurality of polarization directions, a corresponding plurality of channel images, by applying a channel splitting operation, wherein the plurality of channel images represent light intensities corresponding to the plurality of polarization directions; and generating, based on the plurality of plurality of channel images, a degree of linear polarization (DoLP) image.

16. The computing device of claim 12, wherein the operations for the performing of the global feature fusion comprise:

applying a weighted average fusing to the global features in the first collection to preserve structural information in the polarized image.

17. The computing device of claim 12, wherein the operations for the determining of the polarization characterization further comprise:

generating, for the plurality of polarization directions, a corresponding plurality of channel images, by applying a channel splitting operation, wherein the plurality of channel images represent light intensities corresponding to the plurality of polarization directions; and generating, based on the plurality of plurality of channel images, a degree of linear polarization (DoLP) image.

18. The computing device of claim 12, wherein the polarization sensor is at least one of a component of a polarization camera or configured to be removably attached to a camera.

19. A method for processing a polarized image, comprising:

determining, by a computing device, a polarization characterization for a polarized image, wherein the polarization characterization is indicative of polarization data associated with a plurality of polarization directions of incident light in the polarized image;

extracting, by the computing device and from the polarized image, a first collection of global features and a second collection of local features;

performing, by the computing device and based on the polarization characterization:

a global feature fusion to fuse global features in the first collection, and a local feature fusion to fuse local features in the second collection by utilizing a neural network to adaptively fuse an image intensity associated with the polarized image and the polarization characterization for the polarized image, and further comprising:

training the neural network with training data adapted to one or more image processing tasks;

compositing, by the computing device, the polarization characterization with the fused global features and the fused local features to generate a reconstructed image; and providing, by the computing device, the reconstructed image to an image processing resource to perform the one or more image processing tasks.

* * * * *